(12) United States Patent
Gaffoglio et al.

(10) Patent No.: US 10,300,801 B2
(45) Date of Patent: May 28, 2019

(54) BATTERY SWAPPING SYSTEM AND TECHNIQUES

(71) Applicant: Tesla, Inc., Palo Alto, CA (US)

(72) Inventors: Eric Orlando Gaffoglio, Anaheim Hills, CA (US); Alan Clarke, Signal Hill, CA (US); Matthew Lee Brown, Redondo Beach, CA (US)

(73) Assignee: TESLA, INC., Palo Alto, CA (US)

( * ) Notice: Subject to any disclaimer, the term of this patent is extended or adjusted under 35 U.S.C. 154(b) by 56 days.

(21) Appl. No.: 15/607,745

(22) Filed: May 30, 2017

(65) Prior Publication Data

US 2017/0259675 A1 Sep. 14, 2017

Related U.S. Application Data

(63) Continuation of application No. 14/694,995, filed on Apr. 23, 2015, now Pat. No. 9,688,252.

(60) Provisional application No. 61/983,328, filed on Apr. 23, 2014.

(51) Int. Cl.
*B60S 5/06* (2019.01)
*B60L 11/18* (2006.01)

(52) U.S. Cl.
CPC .............. *B60L 11/1822* (2013.01); *B60S 5/06* (2013.01); *B60L 11/18* (2013.01); *Y02T 90/124* (2013.01)

(58) Field of Classification Search
CPC ....... B60L 11/1822; B60S 5/06; Y02T 90/124
See application file for complete search history.

(56) References Cited

U.S. PATENT DOCUMENTS

| 4,102,273 | A | * | 7/1978 | Merkle | .................... B60K 1/04 104/34 |
| 5,612,606 | A | | 3/1997 | Guimarin et al. | |
| 6,094,028 | A | * | 7/2000 | Gu | ...................... H01M 10/441 104/34 |
| 8,006,793 | B2 | | 8/2011 | Heichal et al. | |
| 8,013,571 | B2 | | 9/2011 | Agassi et al. | |
| 8,164,300 | B2 | | 4/2012 | Agassi et al. | |
| 8,973,254 | B2 | | 3/2015 | Droste | |
| 9,026,357 | B2 | | 5/2015 | Park et al. | |
| 9,428,154 | B2 | | 8/2016 | Mulato | |

(Continued)

FOREIGN PATENT DOCUMENTS

JP 62292580 12/1987

*Primary Examiner* — Mark C Hageman
(74) *Attorney, Agent, or Firm* — Garlick & Markison; Bruce E. Garlick

(57) ABSTRACT

A system for exchanging an electrical energy storage system (EESS) of an electric vehicle includes. An EESS station is configured to position an electric vehicle in x and y directions. A vehicle lift raises the electric vehicle to a predetermined height. An EESS lift supports and lowers the EESS and replaces the EESS with a differing EESS. The vehicle lift may be an inboard lift and the EESS lift may be an outboard lift. The system may also include one or more rollers configured to guide the electric vehicle. The system may include a horizontal door having at least one tube positioned thereon for guiding the electric vehicle and/or at least one vehicle chock for positioning the electric vehicle in at least one of the x and y directions. The vehicle lift may include lifting arms to engage jack pads of the electric vehicle.

16 Claims, 47 Drawing Sheets

(56) References Cited

U.S. PATENT DOCUMENTS

| | | | |
|---|---|---|---|
| 2011/0251935 A1* | 10/2011 | German | B60S 5/06 705/30 |
| 2013/0104361 A1 | 5/2013 | Cortitsen | |
| 2013/0197803 A1 | 8/2013 | Park et al. | |
| 2014/0369798 A1 | 12/2014 | Escande et al. | |
| 2016/0107619 A1 | 4/2016 | Clarke et al. | |

* cited by examiner

US 10,300,801 B2

BATTERY SWAPPING SYSTEM AND TECHNIQUES

CROSS-REFERENCE TO RELATED APPLICATION

The present U.S. Utility Patent Application claims priority pursuant to 35 U.S.C. § 120 as a continuation of U.S. Utility application Ser. No. 14/694,995, entitled "BATTERY SWAPPING SYSTEM AND TECHNIQUES", filed Apr. 23, 2015, which claims priority pursuant to 35 U.S.C. § 119(e) to U.S. Provisional Application No. 61/983,328, entitled "BATTERY SWAPPING SYSTEM AND TECHNIQUES", filed Apr. 23, 2014, both of which are hereby incorporated herein by reference in their entirety and made part of the present U.S. Utility Patent Application for all purposes.

BACKGROUND

Vehicles using sustainable energy sources, such as electricity, are becoming more prevalent as an alternative to combustion-engine vehicles. An electric or hybrid vehicle that has at least one electric traction motor typically has a battery pack or other enclosure that contains one or more electrochemical cells that provide propulsion energy for the motor or motors. Because the process of charging such cells usually takes some amount of time, some vehicles are designed so that the battery can be replaced with another battery, to replenish power in the vehicle or to address malfunction in the current battery.

BRIEF DESCRIPTION OF DRAWINGS

FIG. 10 shows the tube guide on the door as the vehicle is pulling in.

DETAILED DESCRIPTION

This document describes systems and techniques for swapping an electrical energy storage system, such as a battery pack of an electric vehicle. In some implementations, a system can be used to exchange the battery pack of a model S or Model X vehicle from Tesla Motors, Inc., for another (e.g., fully charged) battery pack. For example, this can provide a more rapid way of replenishing the electric energy for the electric vehicle and can enable electric vehicles to travel essentially nonstop on long road trips.

In some implementations, the battery swap system is configured for use by one or more technicians, who will monitor certain aspects of the system's operation and make necessary inputs when appropriate. For example, the battery-swapping system can be installed at a remote location (e.g., along a highway between two cities) and one or more technicians can be stationed at the location for operating the system. This can reduce or eliminate the need for the system to have vision components, which may otherwise be needed to align the battery pack or other components. Using techniques described herein it may be possible to exchange the battery pack of a vehicle in less than fifteen minutes.

Figure 1:
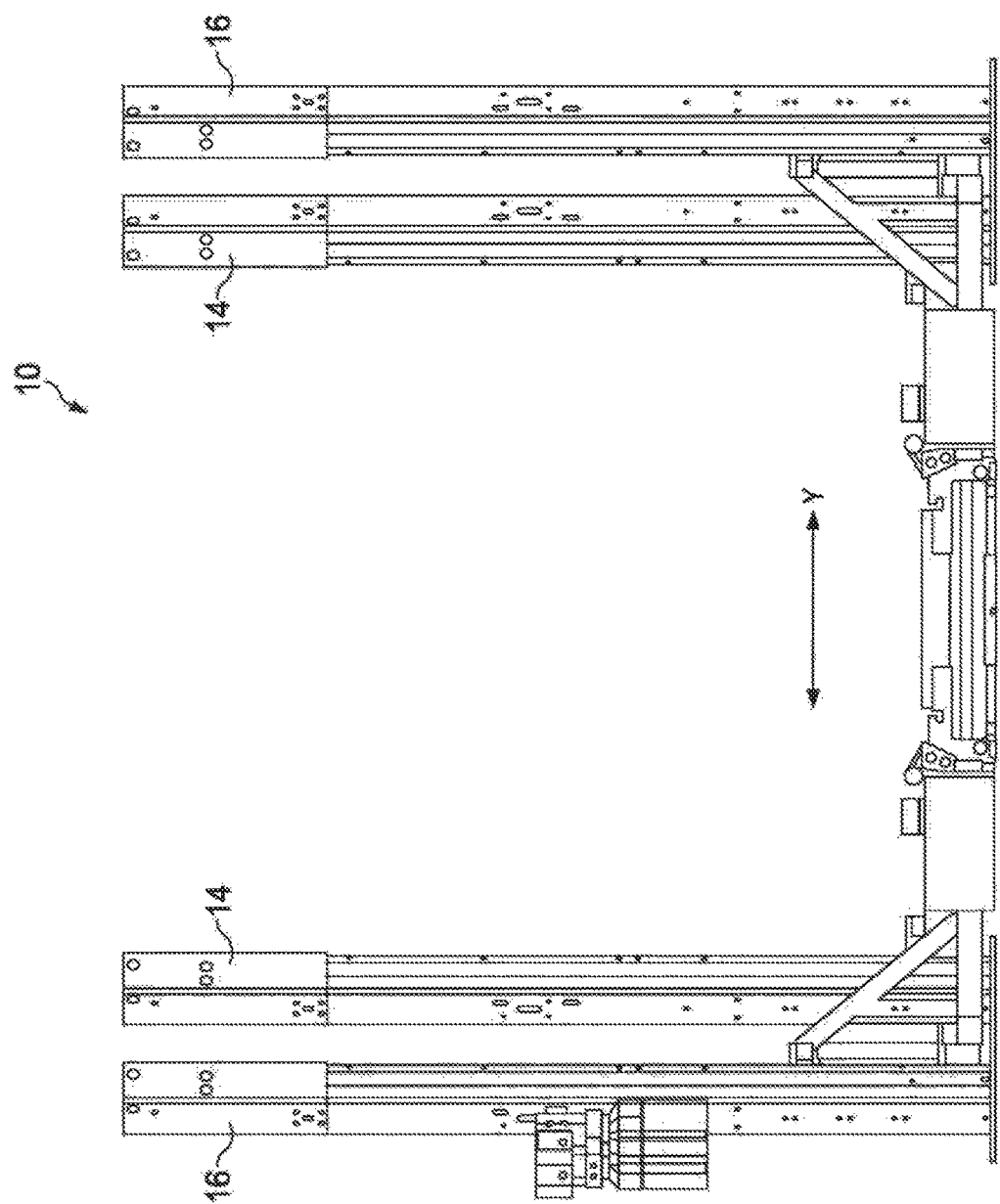
FIGS. 1-3 shows a layout of an example concept in respective front, side and top views.
Figure 2:
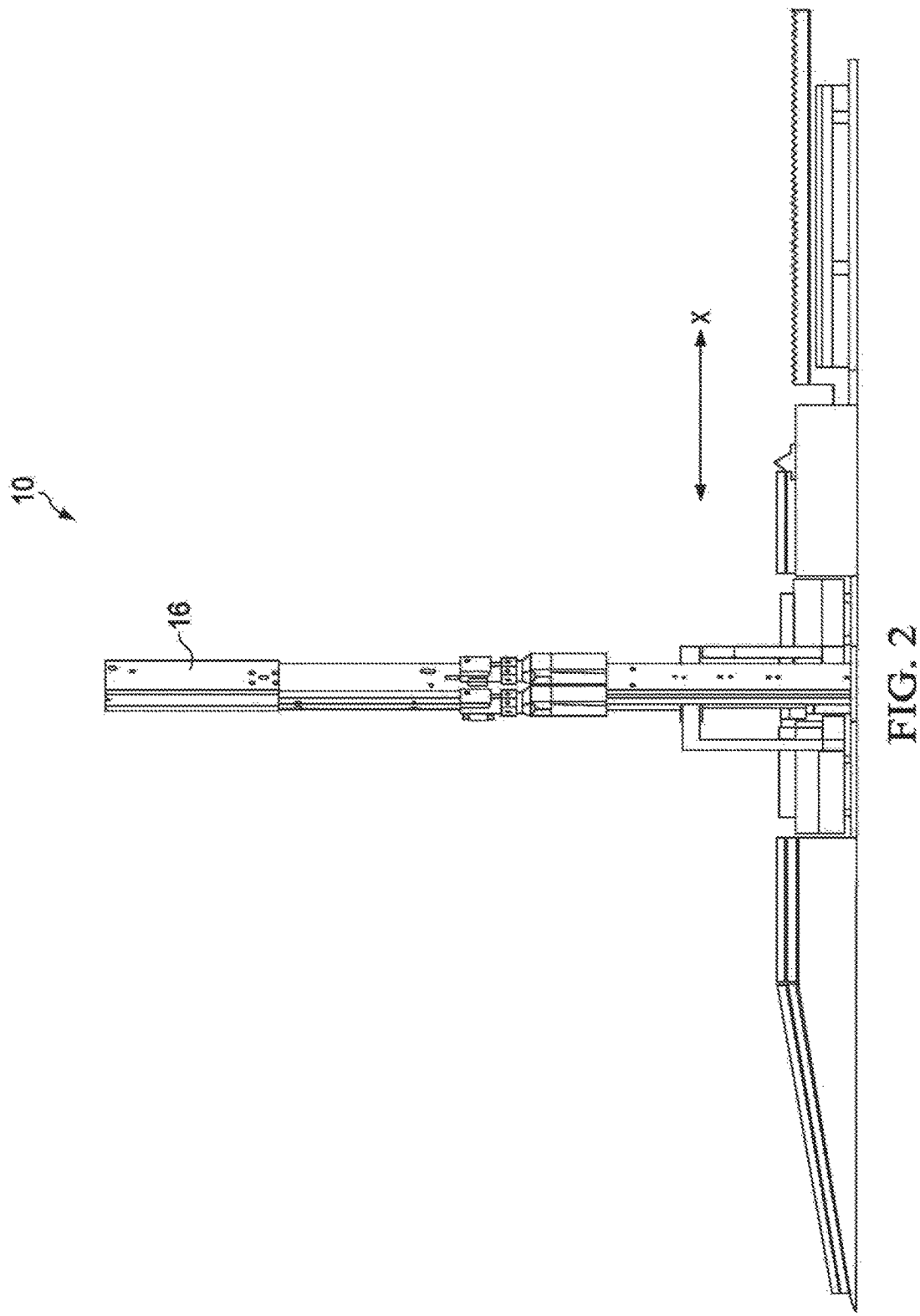
Figure 3:
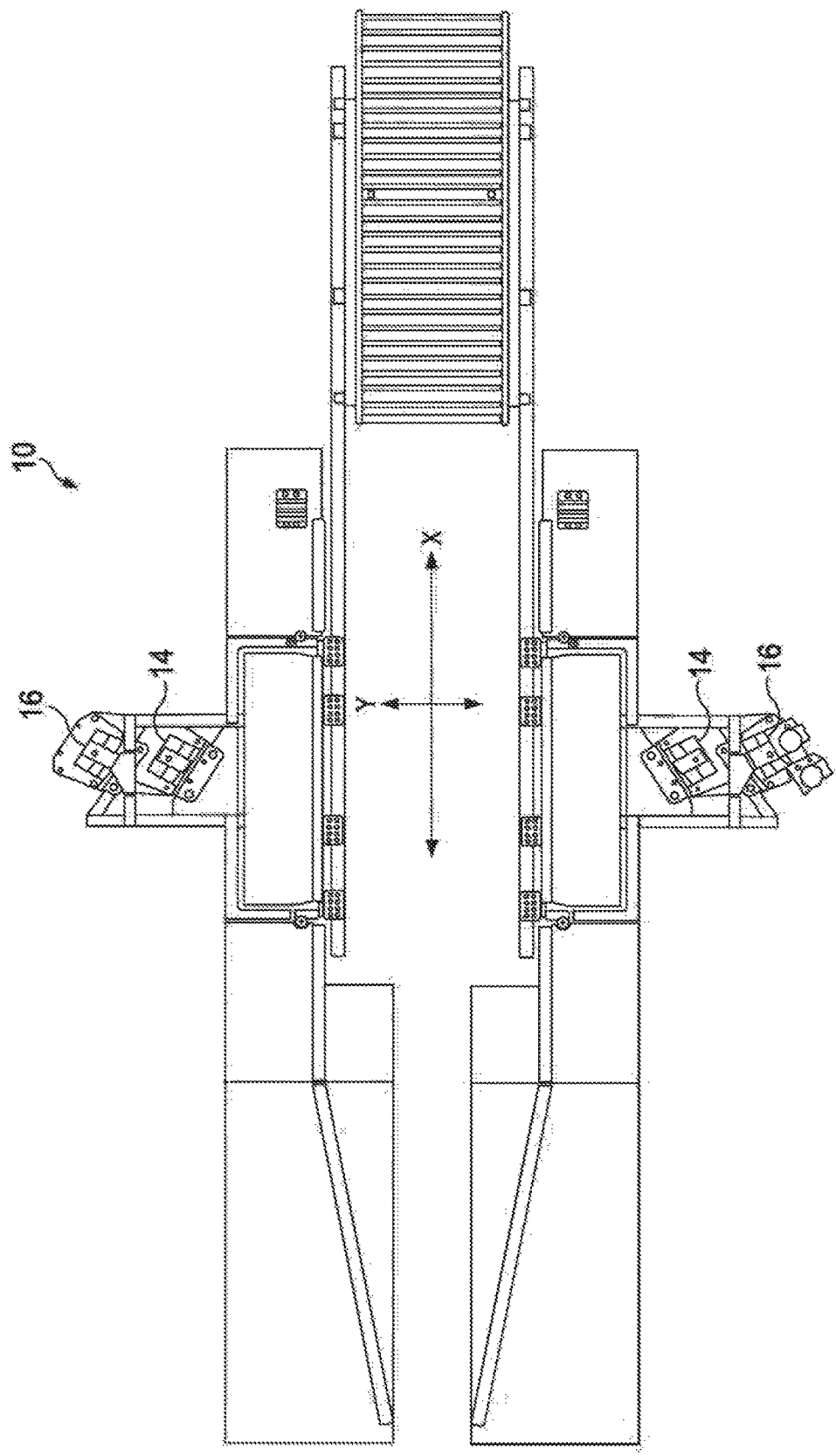

FIGS. 1-3 show a layout of an example concept of an electrical energy storage system (EESS) exchange station 10 in respective front, side and top views. The system includes inboard lifts 14 and outboard lifts 16. As shown in FIG. 3, inboard lifts 14 are arranged so as to be positioned on either side of a vehicle, in a Y direction, once the vehicle is on EESS exchange station 10, wherein the Y direction is perpendicular to an X direction in a horizontal plane. Similarly, outboard lifts 16 (or "battery lifts") are also arranged so as to be positioned on either side of a vehicle (once on EESS exchange station 10), and outside of inboard lifts 14, in a Y direction relative to the vehicle. Here, the inboard lifts 14 (or "vehicle lifts") are designed to raise the vehicle above ground, and the outboard lifts 16 are designed to remove the battery pack from underneath the vehicle in the elevated position, and replace the battery pack with a new one. The listed measurements and other dimensions are for illustrative purposes only.

Figure 4:
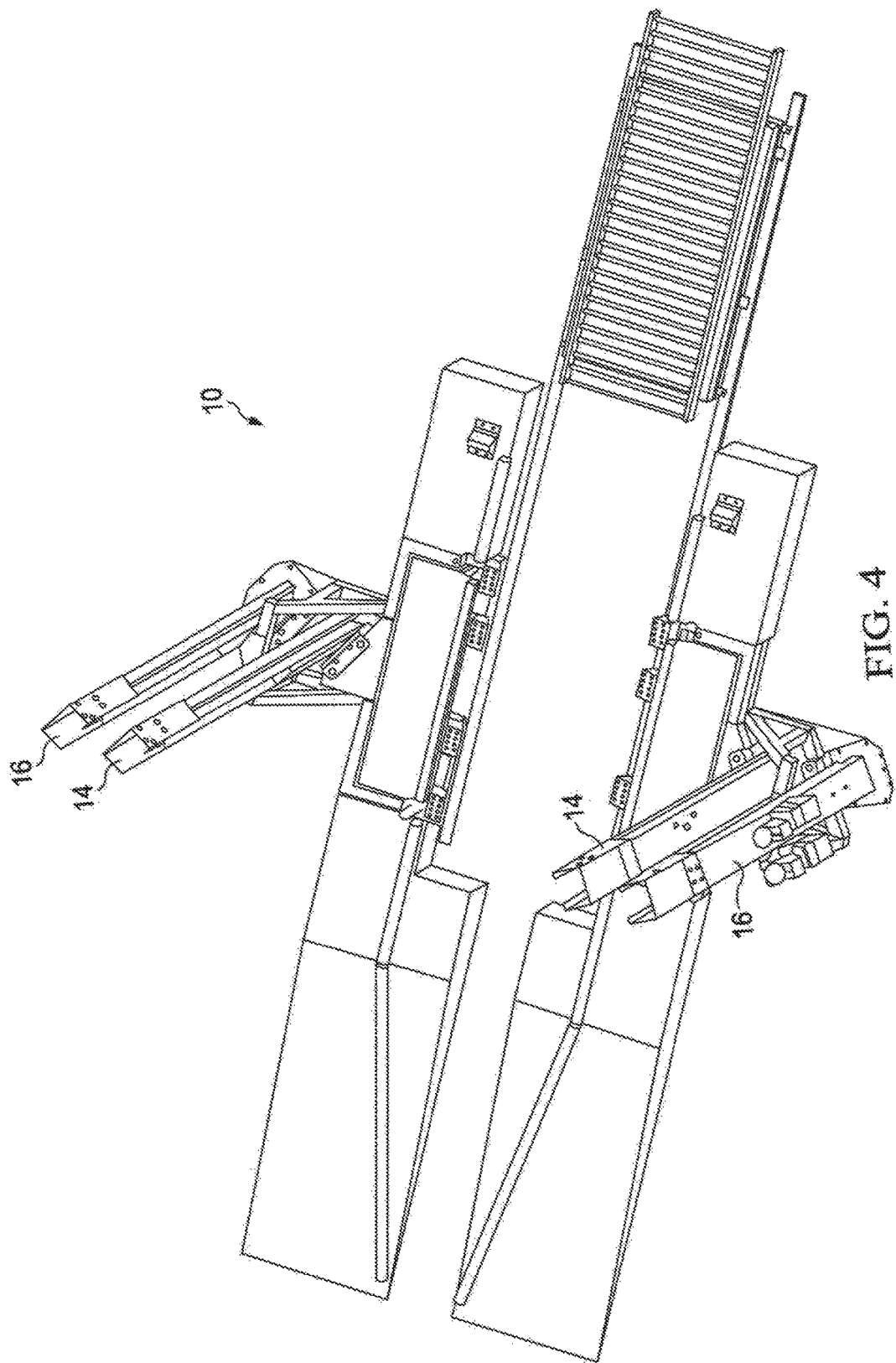
FIG. 4 shows the system before a vehicle enters the station.
Figure 5:
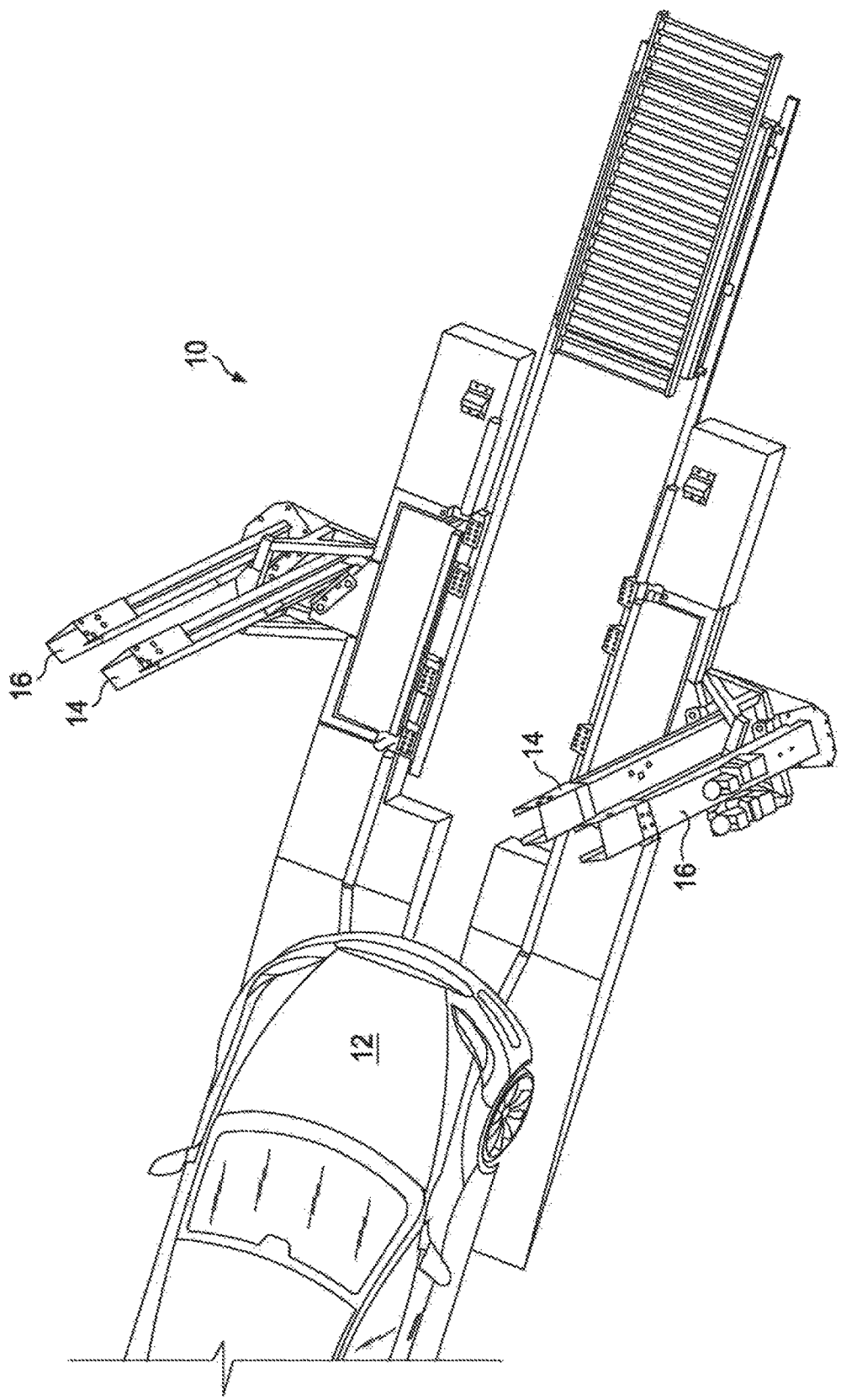
FIG. 5 shows that the vehicle is guided by rollers as it enters the station.
Figure 6:
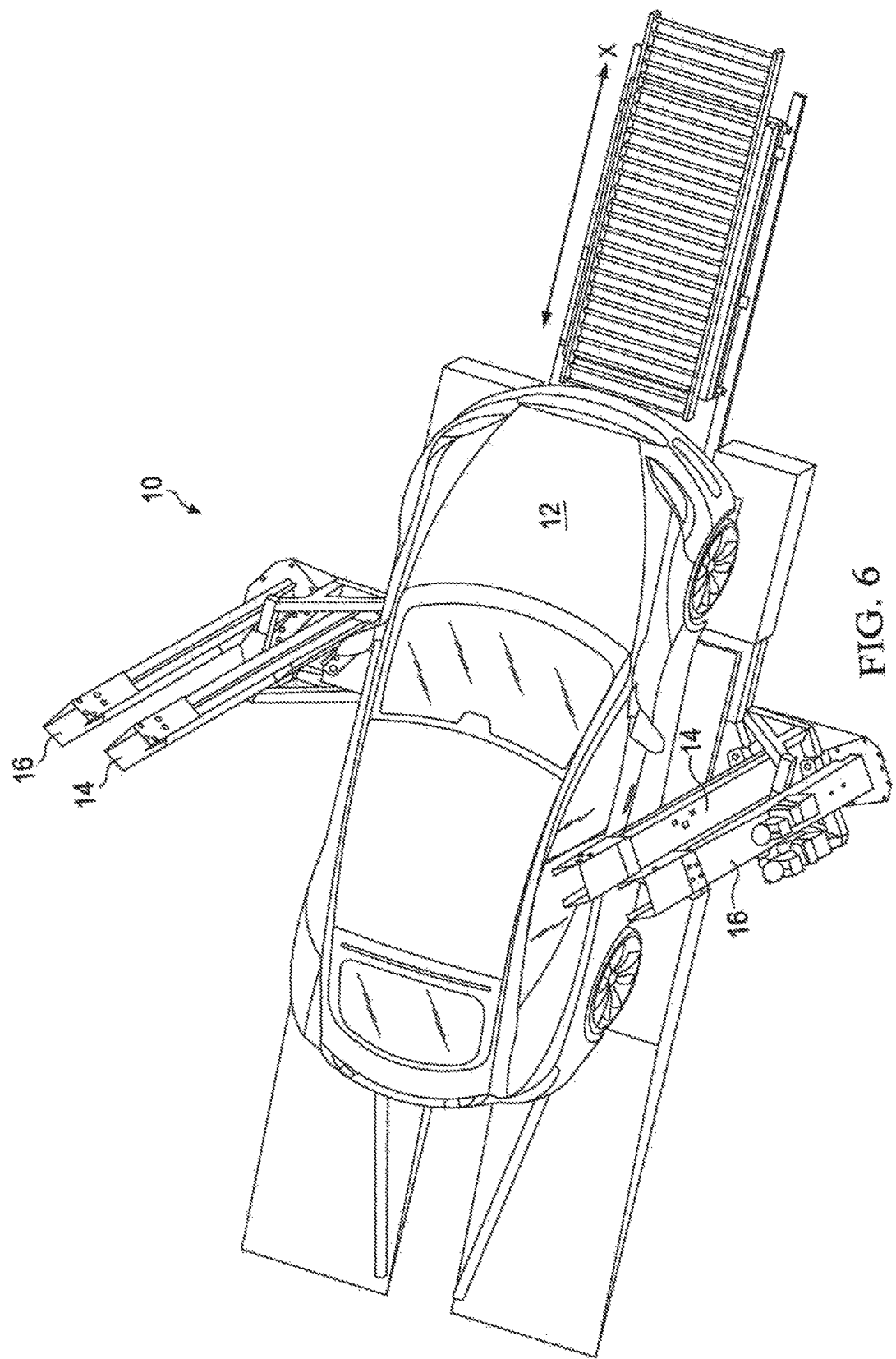
FIG. 6 shows that the vehicle creeps forward until it is correctly positioned in the X direction.
Figure 7:
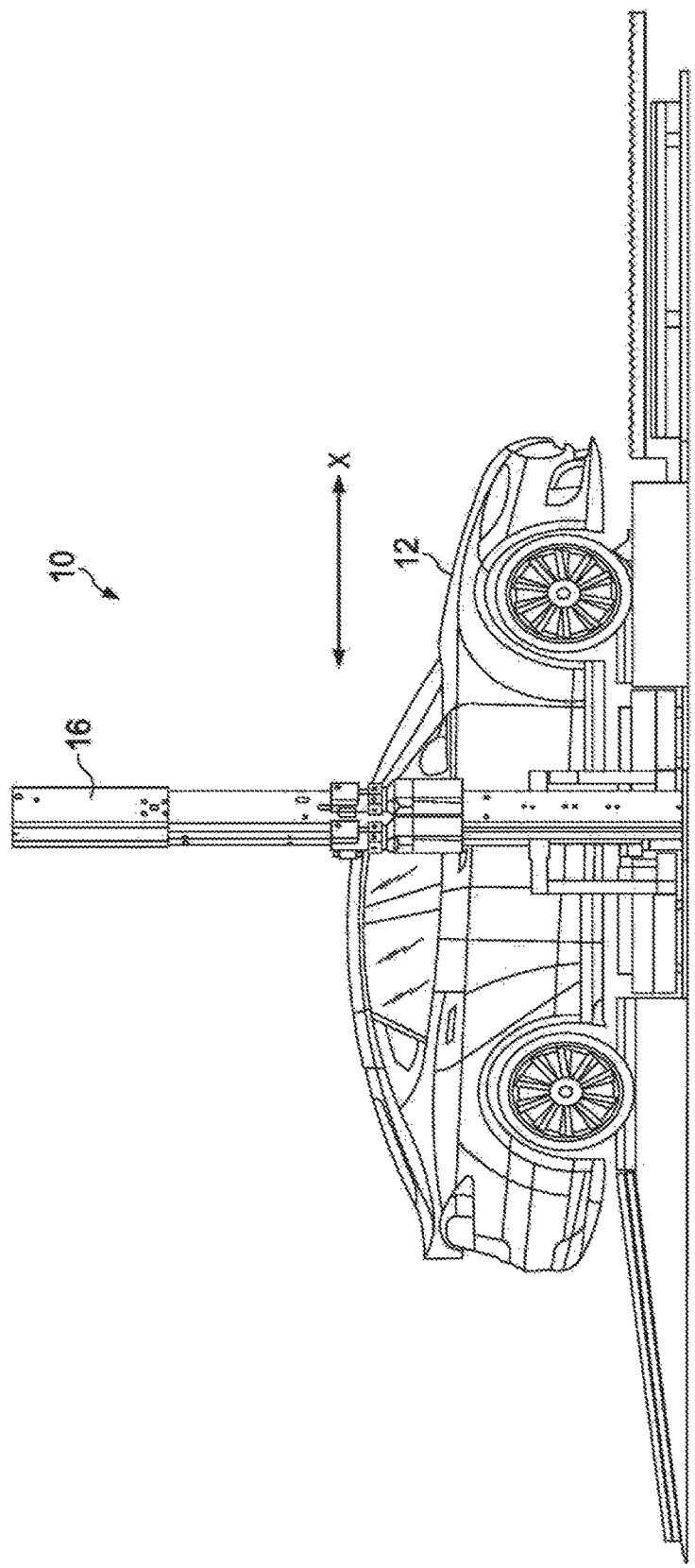
FIG. 7 shows that the vehicle is correctly positioned in the X direction, that the jack mode is enabled, and that vehicle power is turned off.
Figure 8:
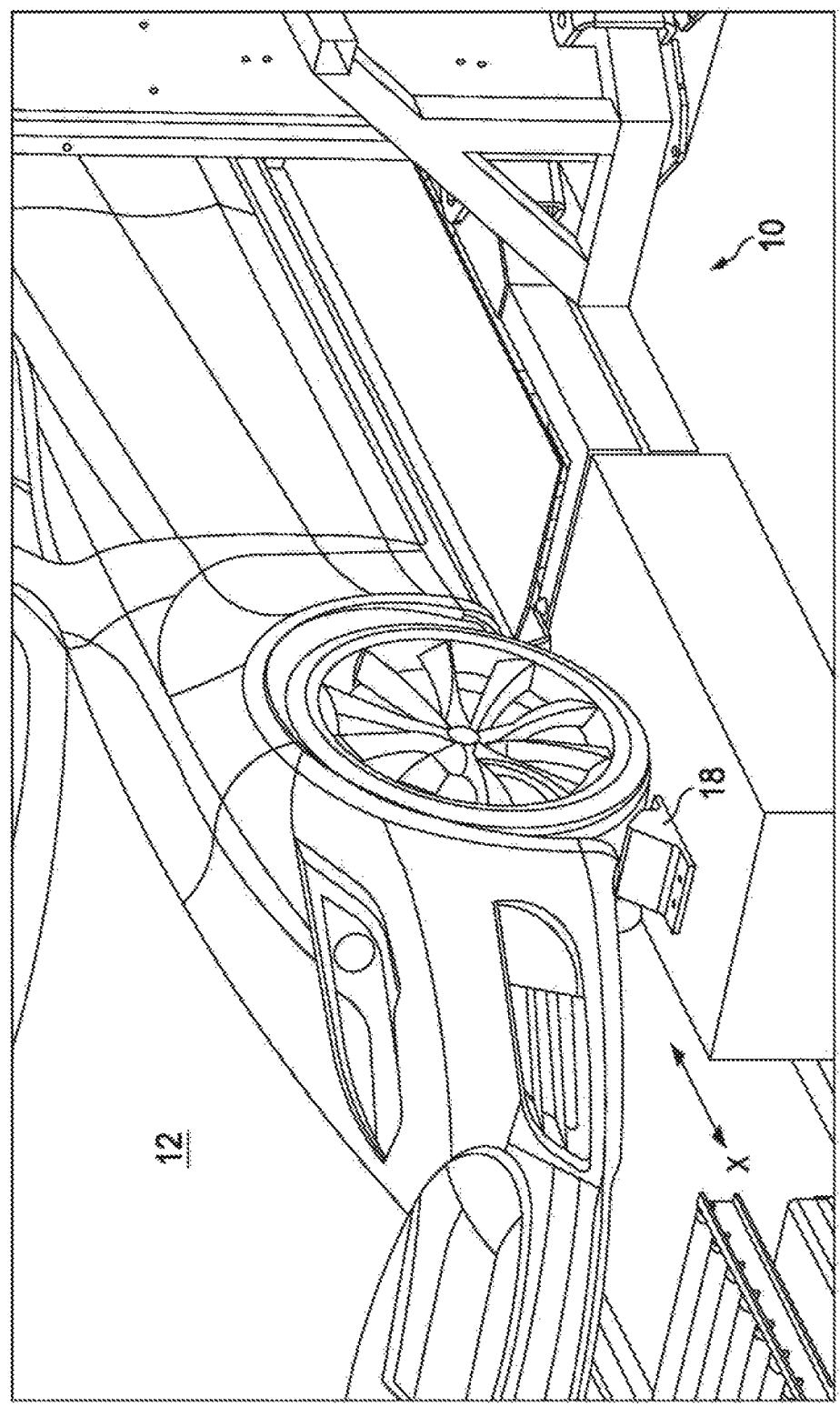
FIG. 8 shows that vehicle chocks can be used to control the position in X direction.
Figure 9:
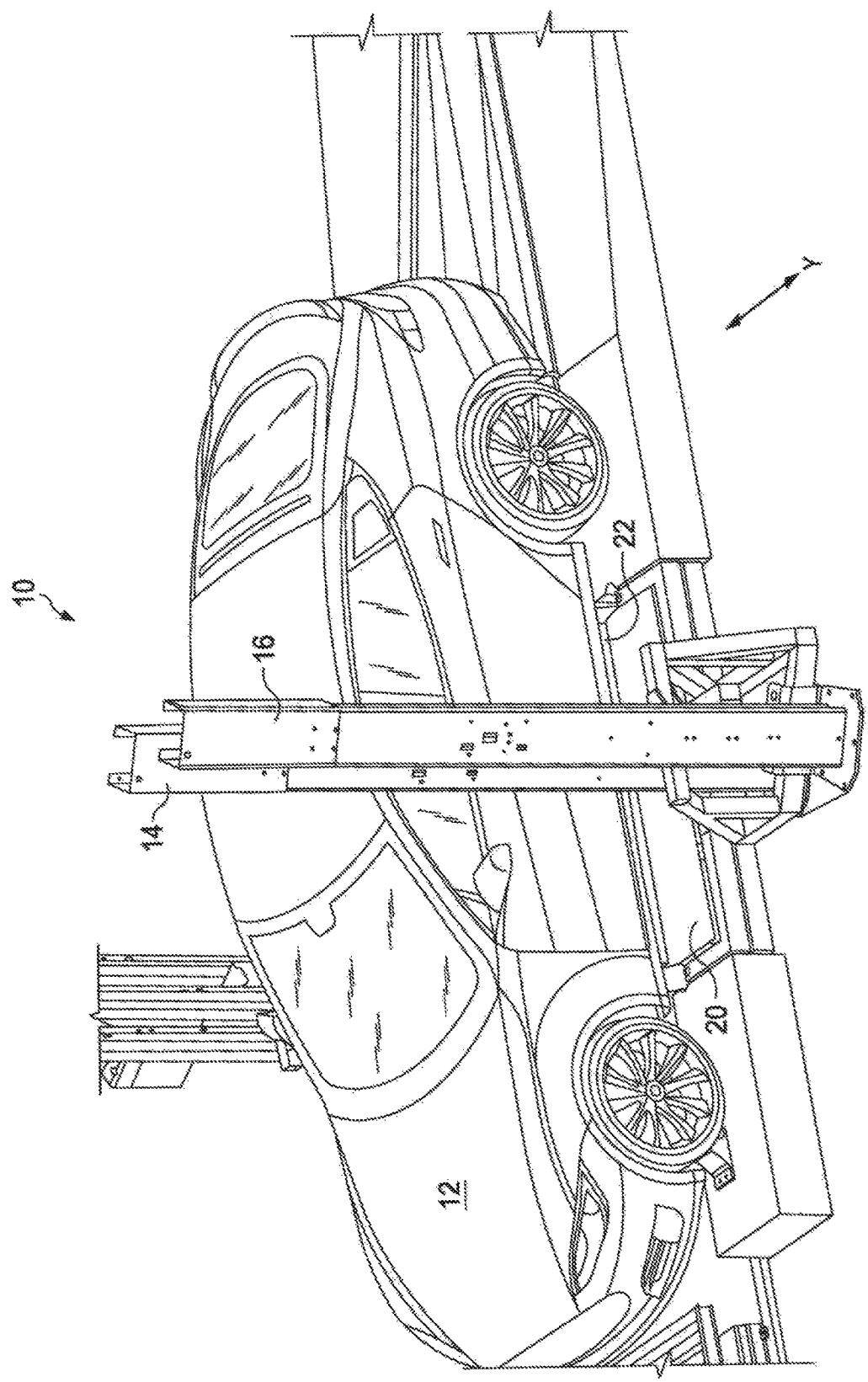
FIG. 9 shows that the vehicle rolls over horizontal doors while pulling in, and that steel tube guides on the doors can help align the vehicle in the Y direction.
Figure 10:
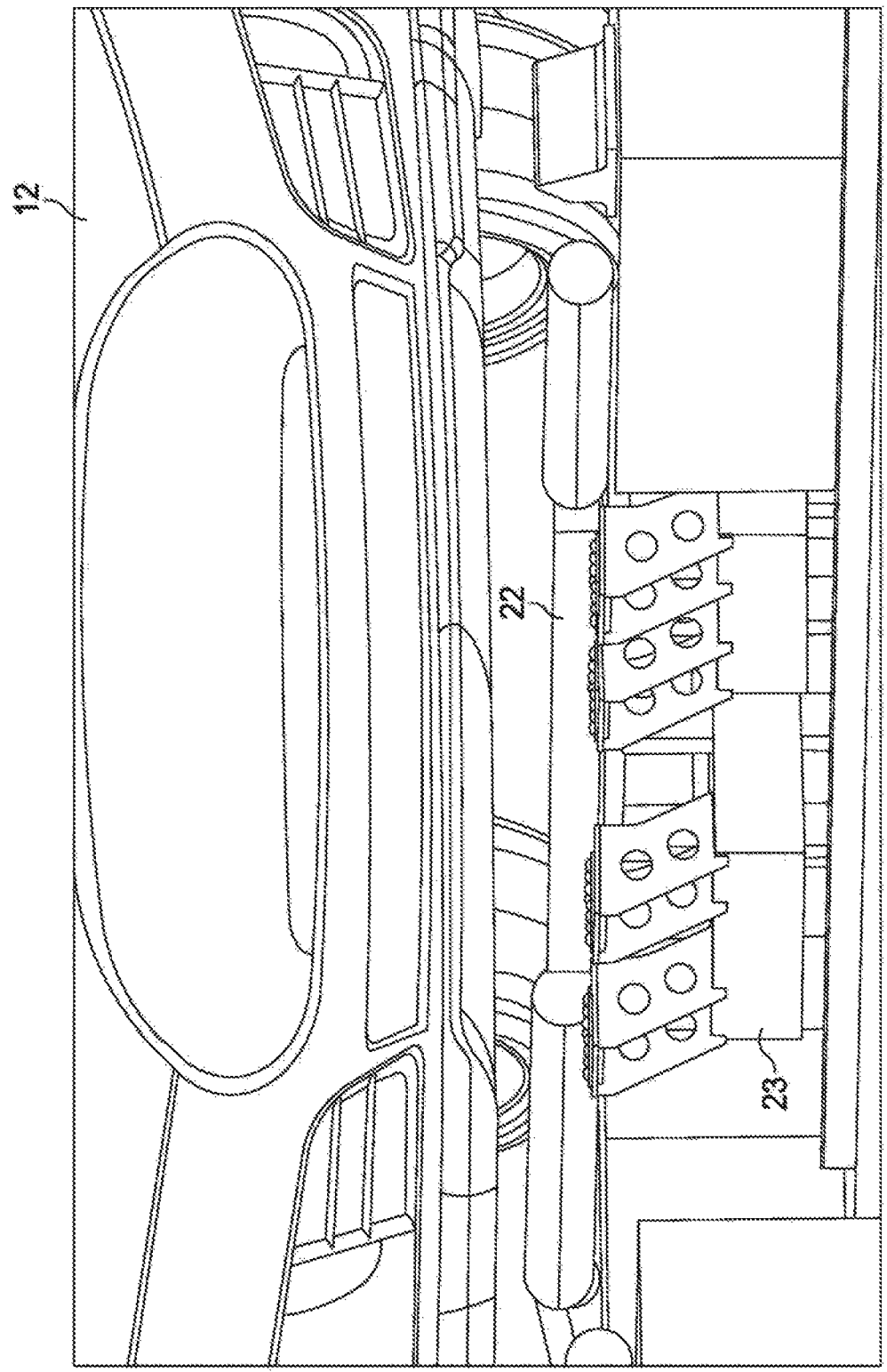
Figure 11:
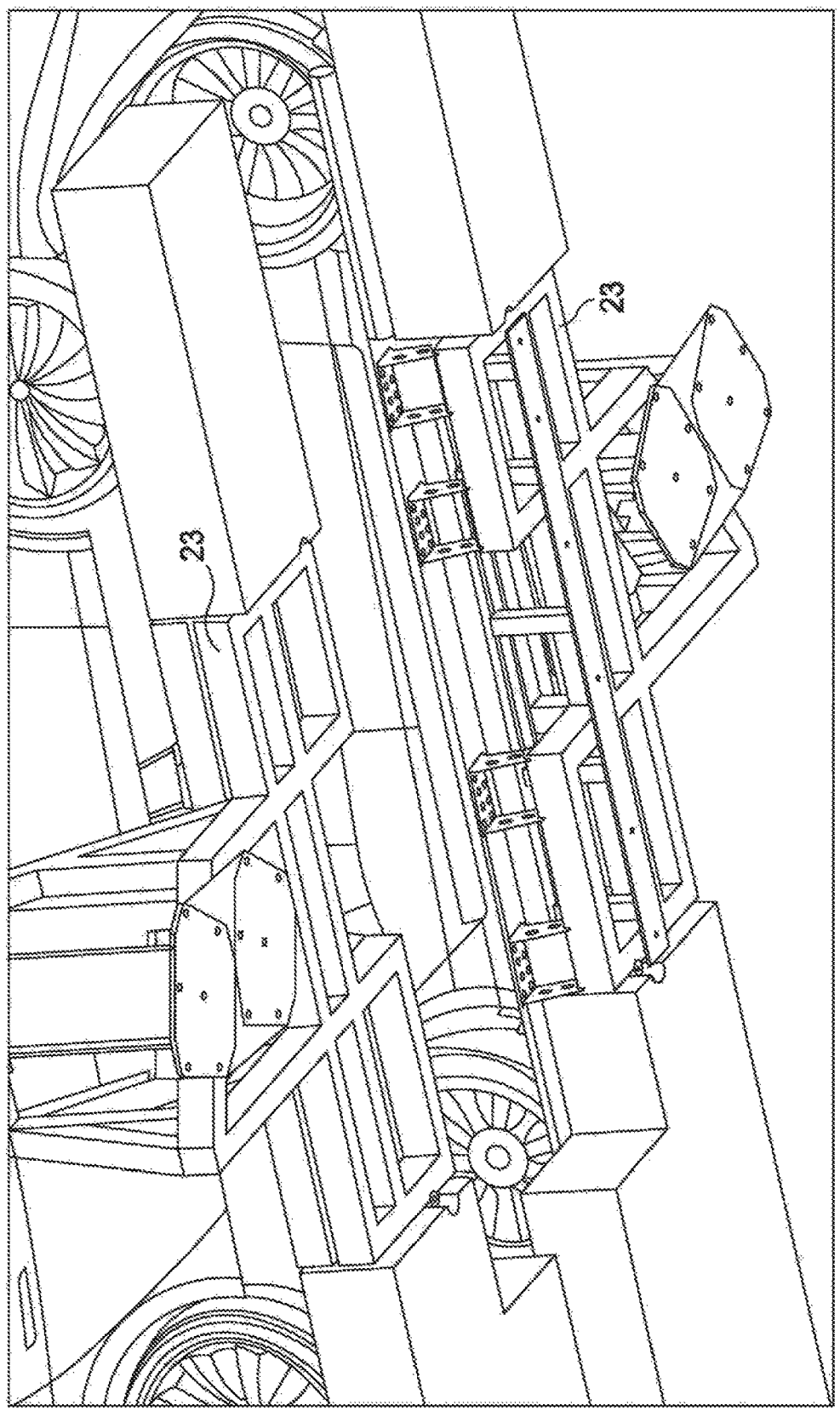
FIG. 11 is a view from below and shows door supports, and a tube under the door.

FIGS. 4-44 show examples relating to battery swap processes. FIG. 4 shows the EESS exchange station 10 system before a vehicle enters the station. FIG. 5 shows that the vehicle 12 is guided by rollers as it enters the station 10. FIG. 6 shows that the vehicle creeps forward until it is correctly positioned in the X direction. FIG. 7 shows that the vehicle is correctly positioned in the X direction, that the jack mode is enabled, and that vehicle power is turned off. FIG. 8 shows that vehicle chocks 18 can be used to control the position in X direction. FIG. 9 shows that the vehicle rolls over horizontal doors 20 while pulling in, and that steel tube guides 22 on the doors can help align the vehicle in the Y direction (see also tube guides 22 in FIGS. 17 and 18). The doors also cover the battery support structures. FIG. 10 shows the tube guide 22 on the door as the vehicle is pulling in, as well as one battery support structure 23. FIG. 11 is a view from below and shows door supports, a tube under the door and battery support structures 23.

Figure 12:
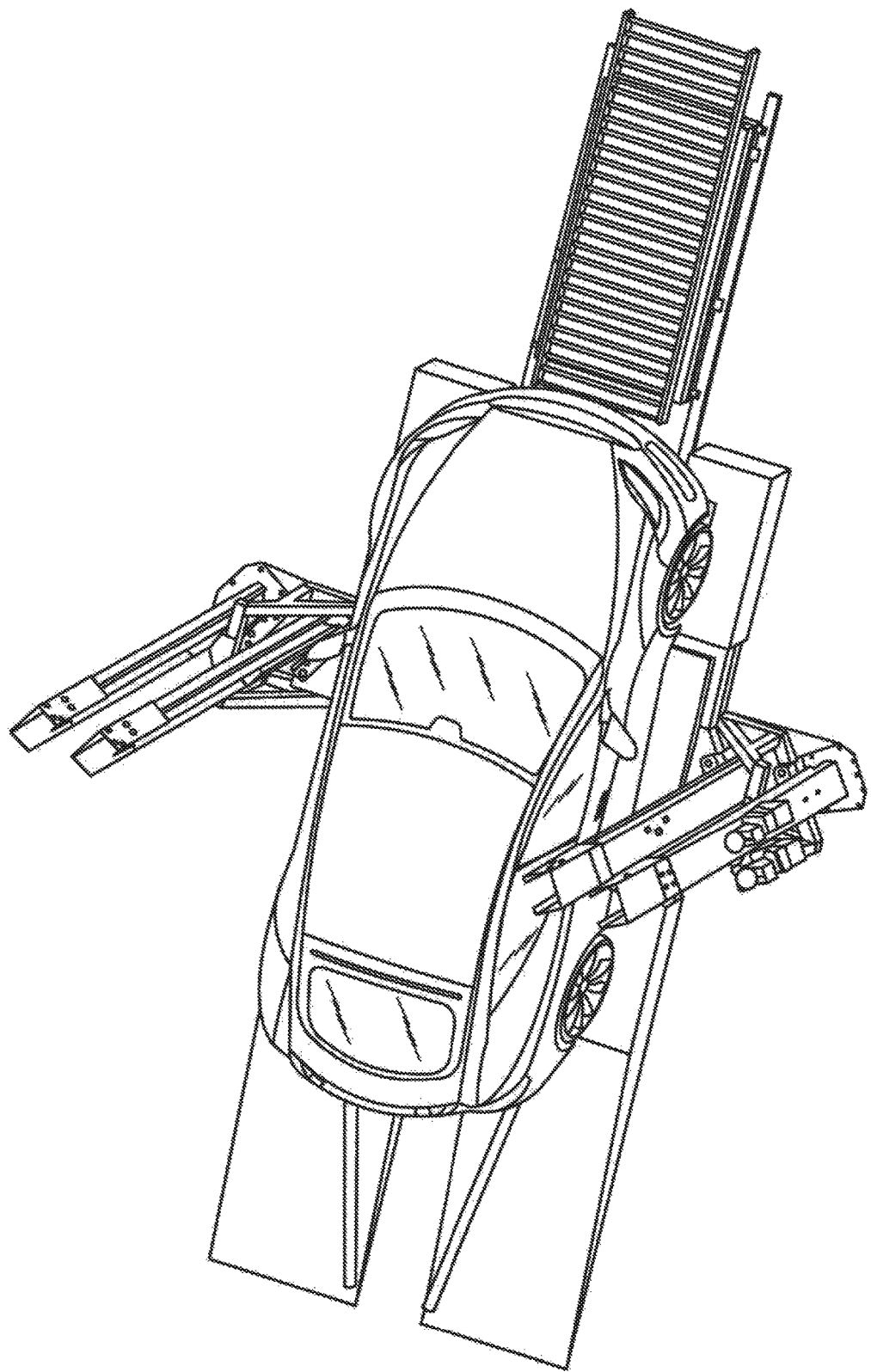
FIG. 12 shows that the process of raising the vehicle is beginning.
Figure 13:
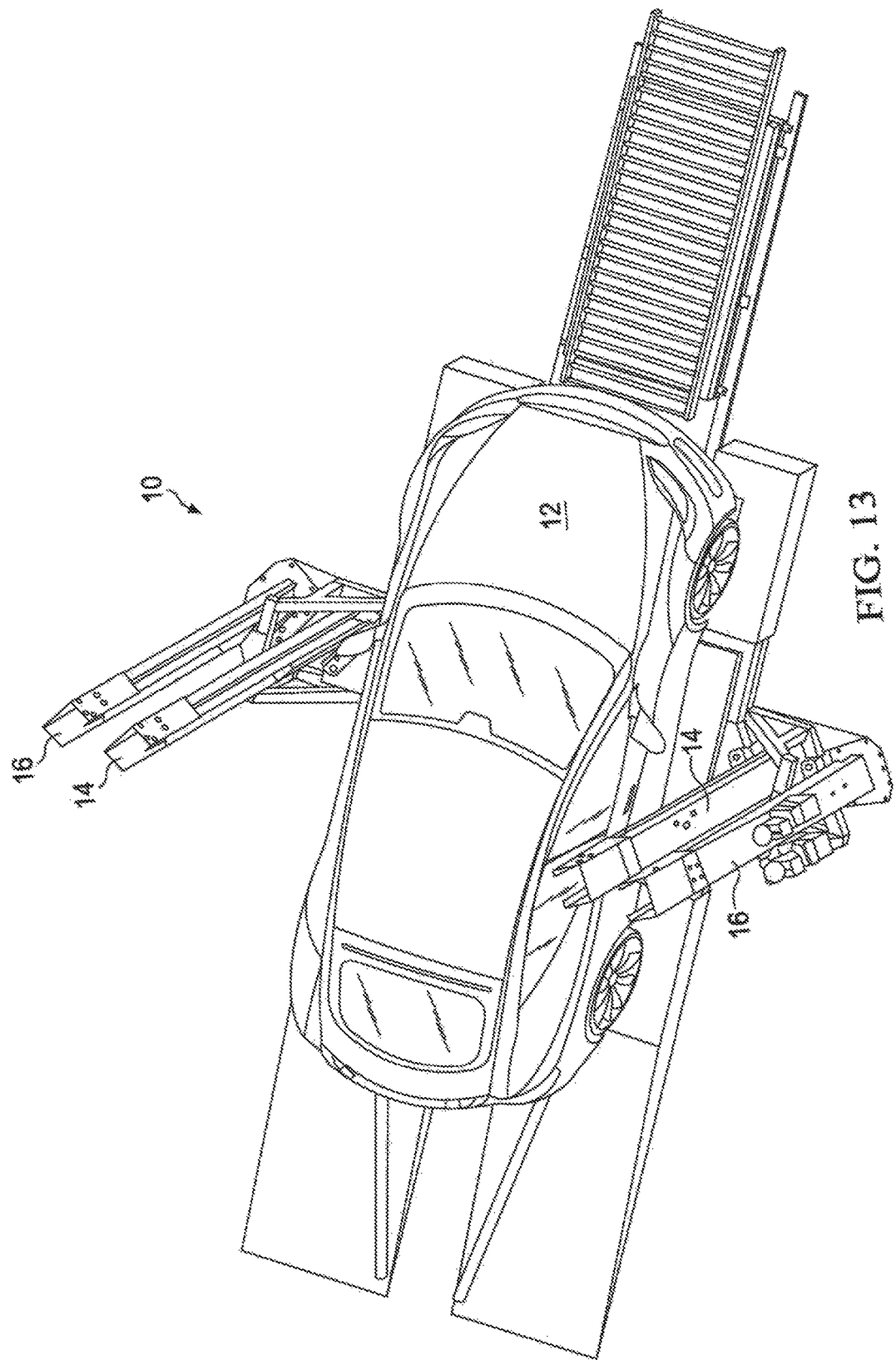
FIG. 13 shows that the inboard lifts are starting the process of raising the vehicle to a predetermined height (in this example, about 65 inches).
Figure 14:
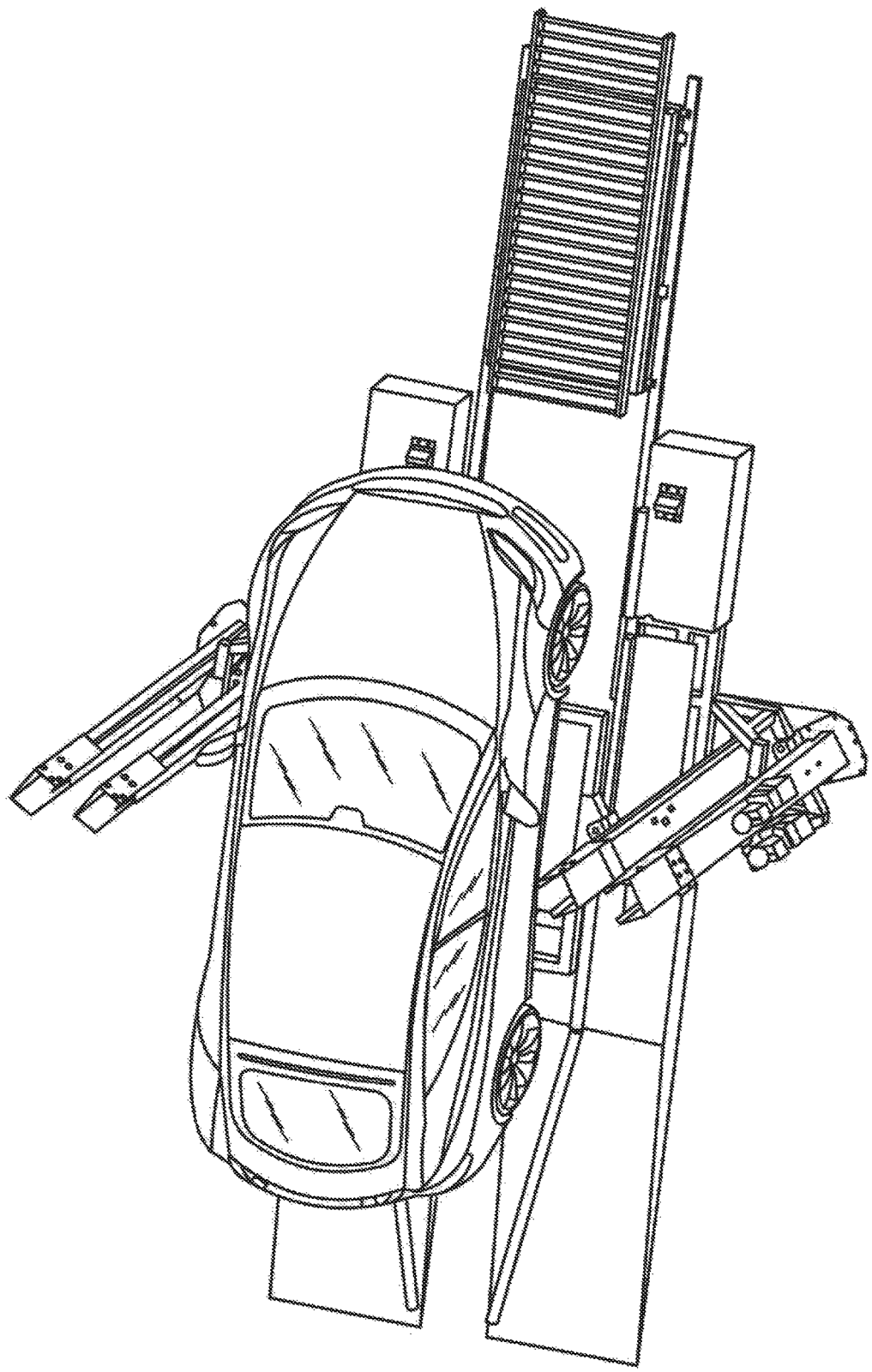
FIGS. 14-15 show that the vehicle has been lifted to the predetermined height.
Figure 15:
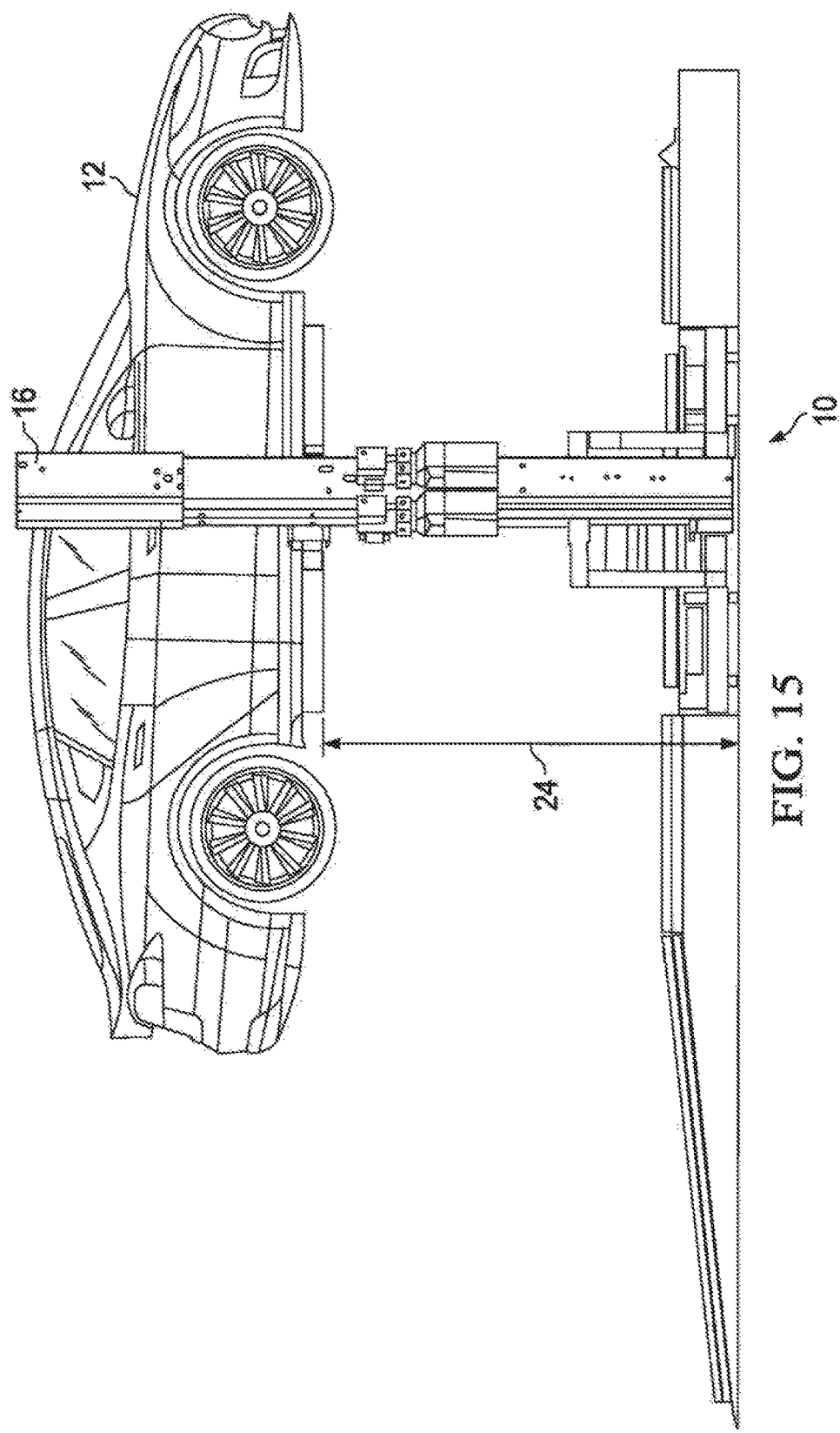
Figure 16:
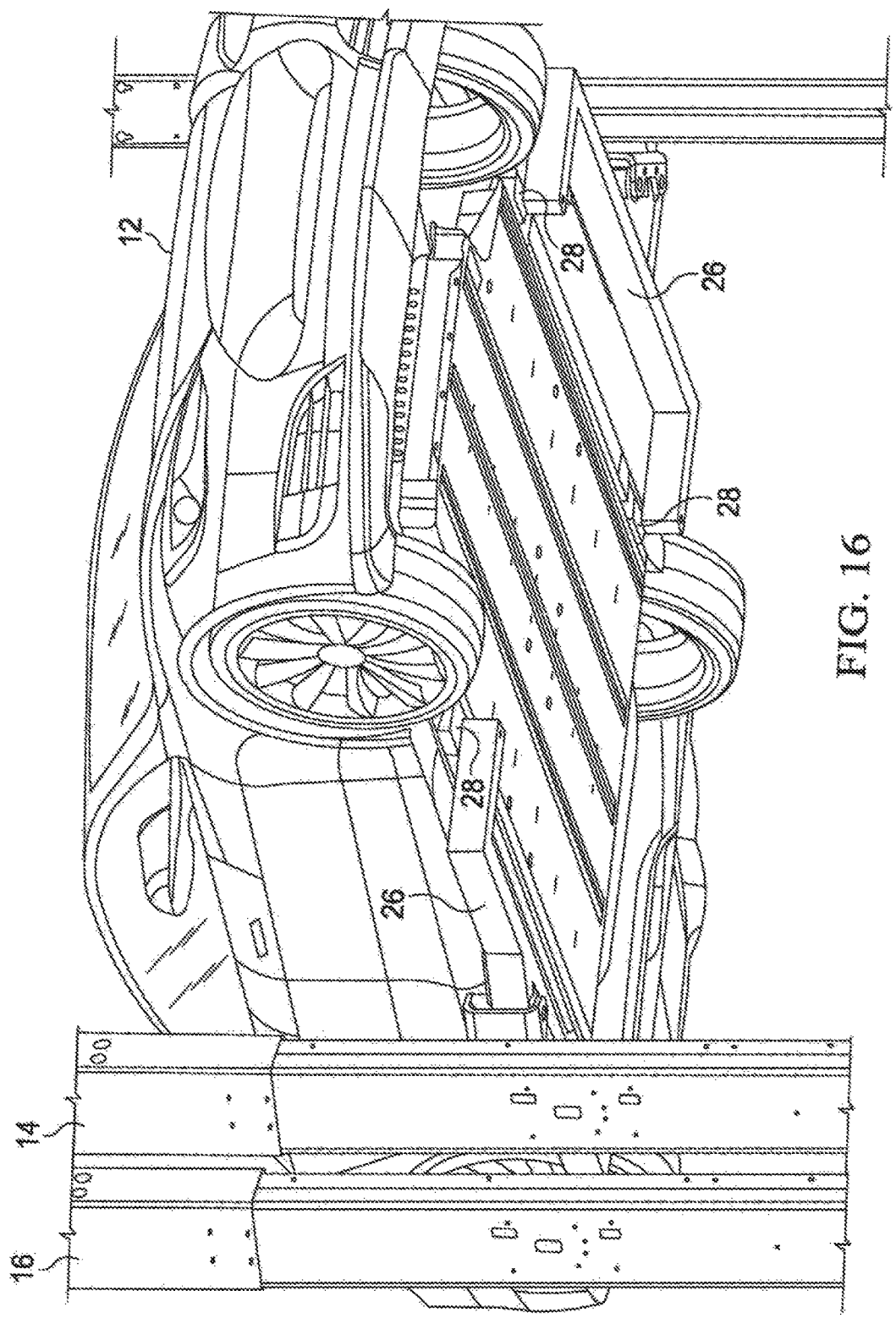
FIG. 16 shows that lifting arms of the inboard lifts can engage jack pads (or any other suitable lifting points) on the vehicle.

FIG. 12 shows that the process of raising the vehicle is beginning. The driver of the vehicle (e.g., the vehicle owner or a valet) can exit the vehicle before the raising begins. FIG. 13 shows that the inboard lifts 14 are starting the process of raising the vehicle to a predetermined height (in this example, about 65 inches). FIGS. 14-15 show that the vehicle has been lifted to the predetermined height, as shown by reference number 24 in FIG. 15. FIG. 16 shows that lifting arms 26 of the inboard lifts 14 can engage jack pads 28 (or any other suitable lifting points) on the vehicle 12. In some implementations, the car is suspended at four points, however, only three are shown in FIG. 16 due to lifts 14 and 16 obscuring one of the points. For example, cone locators can be used for positioning.

Figure 17:
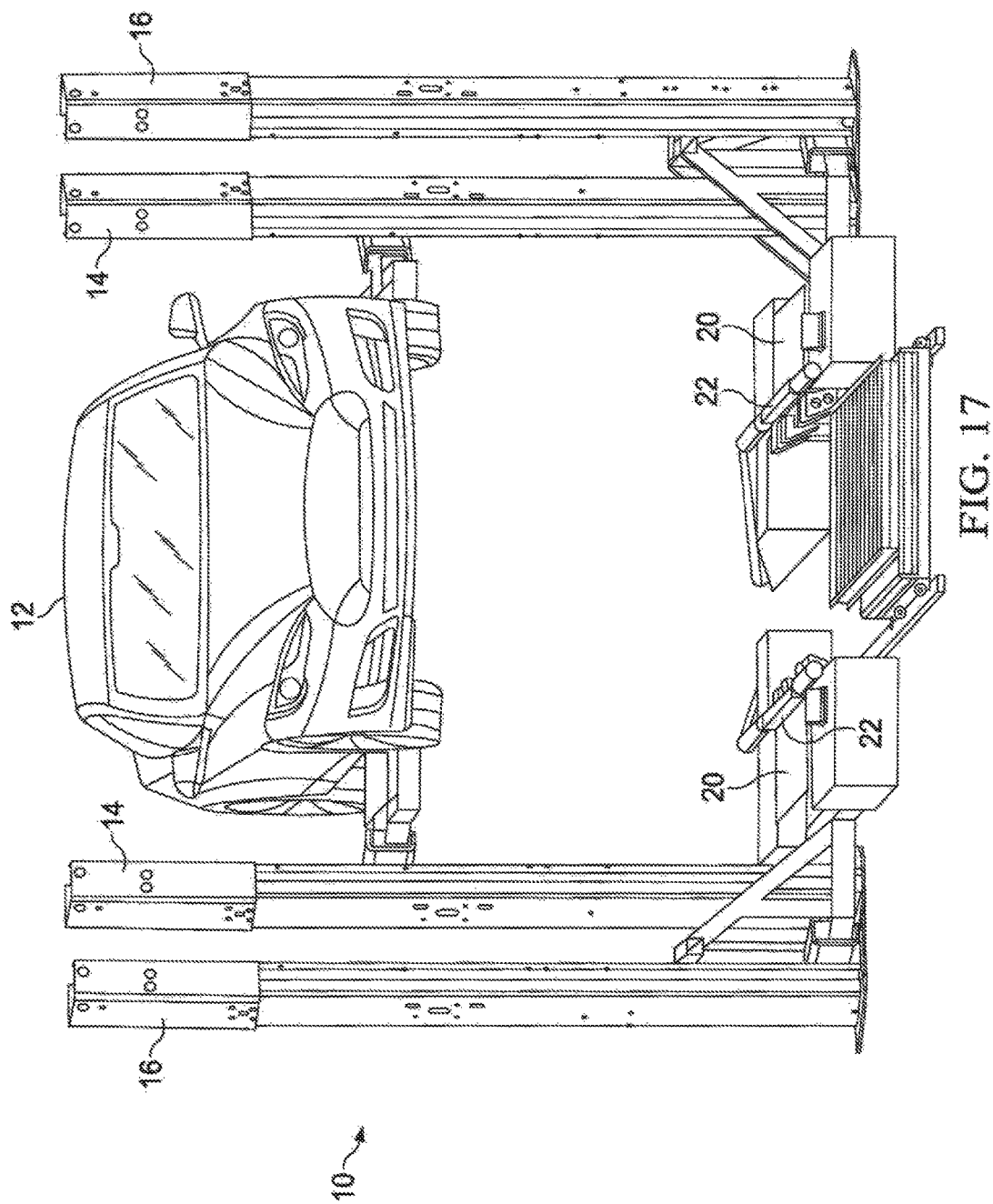
FIG. 17 shows that the system is ready to open the floor doors.
Figure 18:
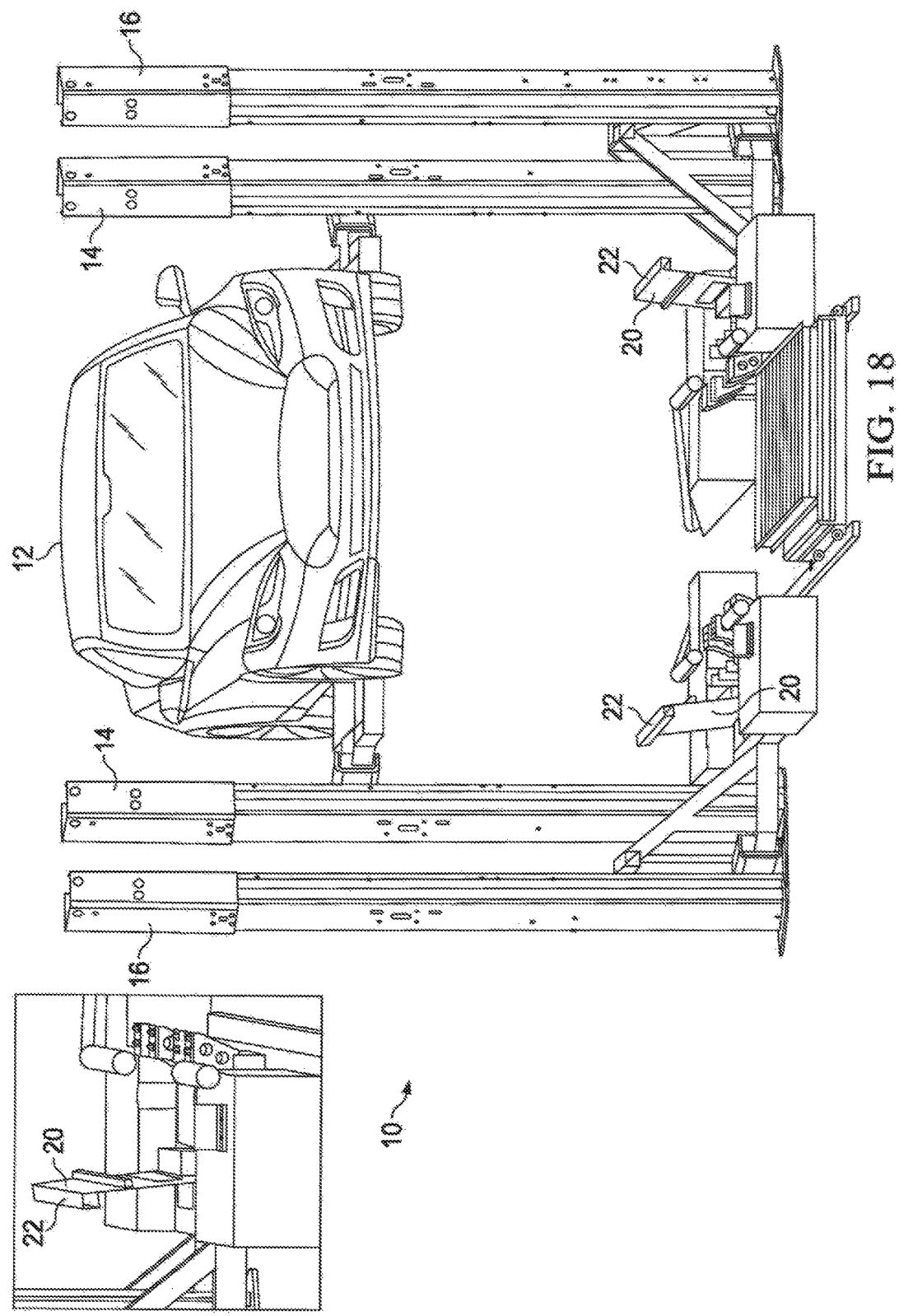
FIG. 18 shows that the doors have been opened.

FIG. 17 shows that the system is ready to open the floor doors 20. FIG. 18 shows that the doors 20 have been opened. For example, the inset shows that the door can pivot over-center to stay open.

Figure 19:
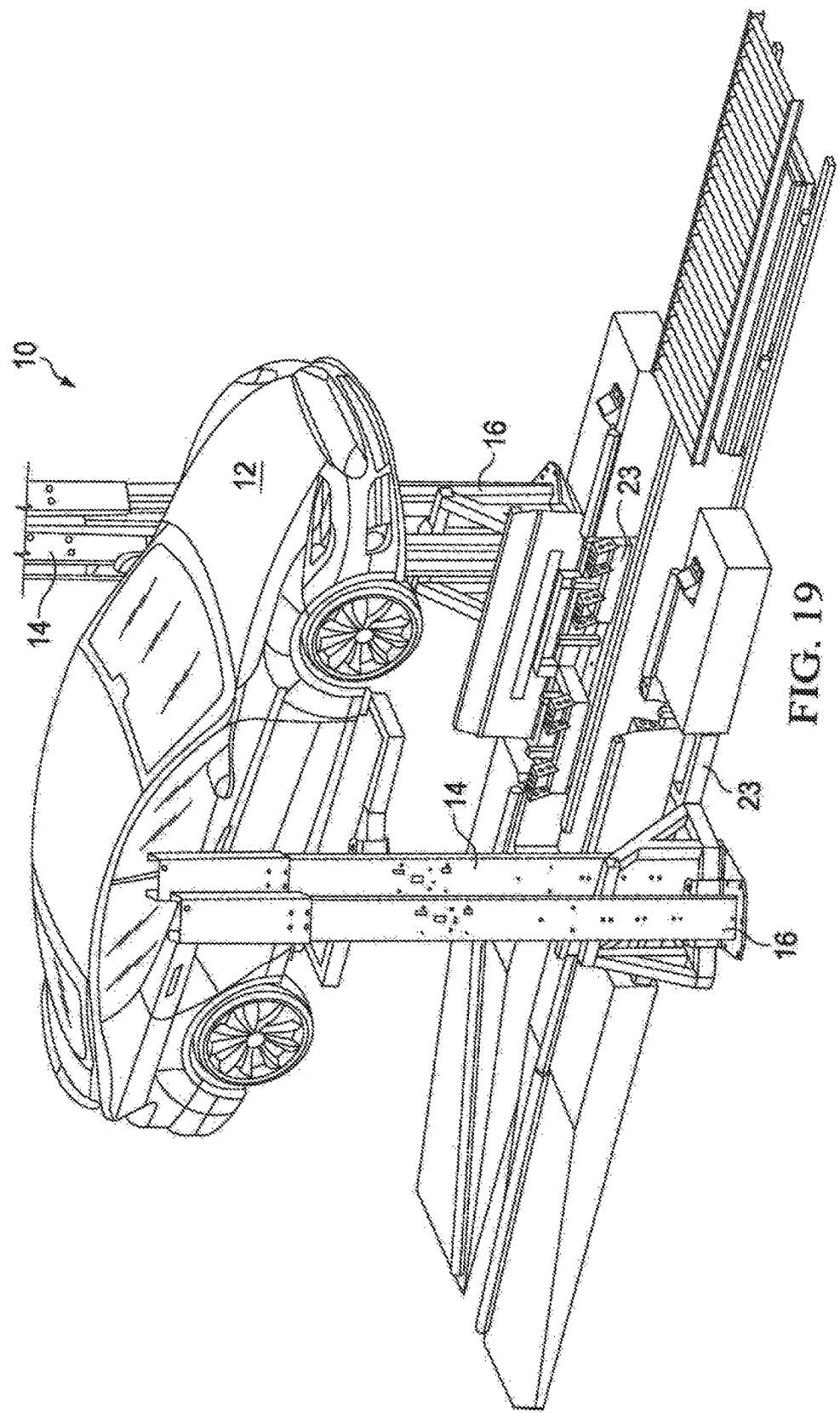
FIG. 19 shows that the system is ready to raise the battery lift (here, the outboard lift).
Figure 20:
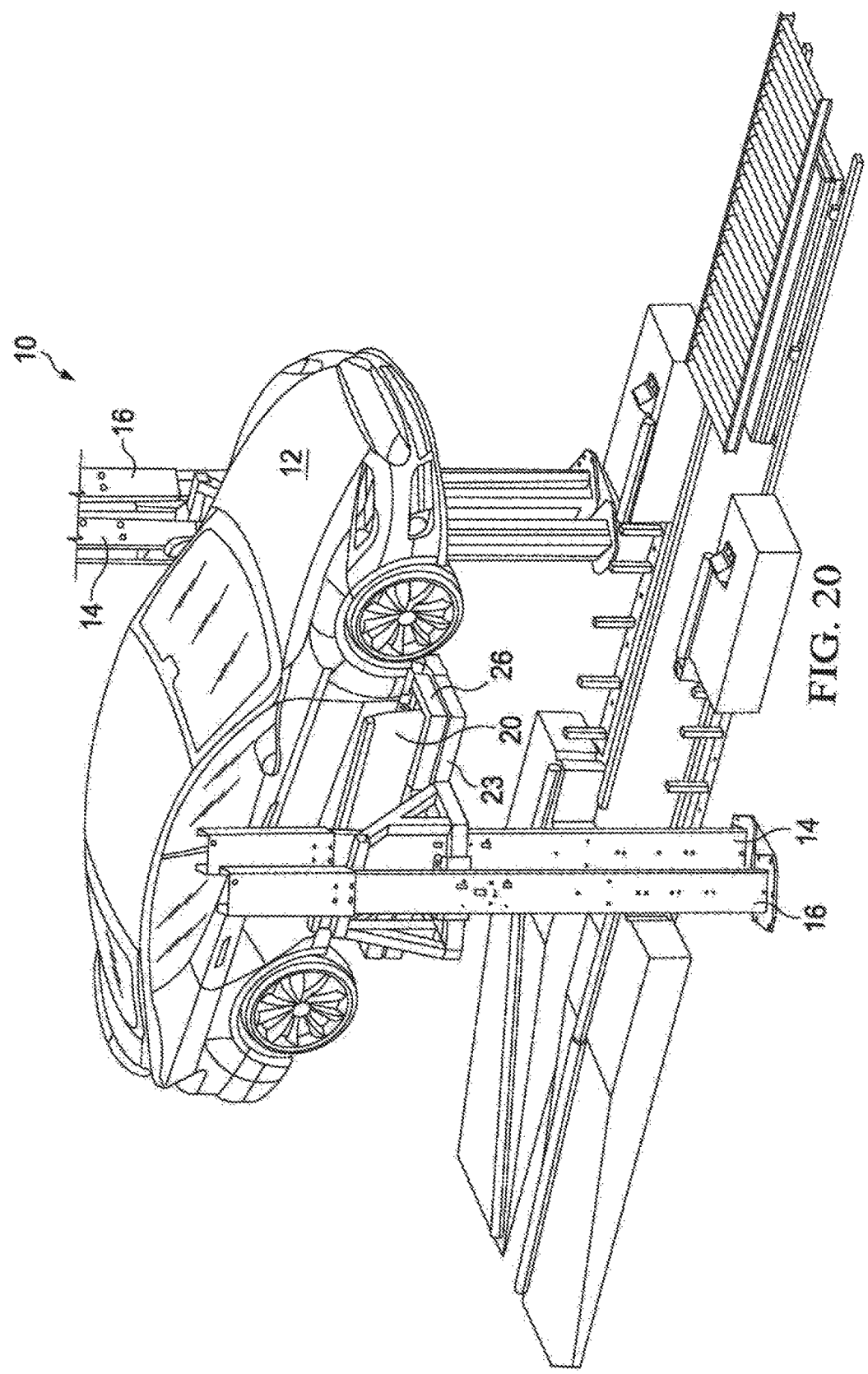
FIGS. 20-22 show that the battery lift has been raised until it touches the underside of the battery pack, so as to support the battery pack for removal.
Figure 21:
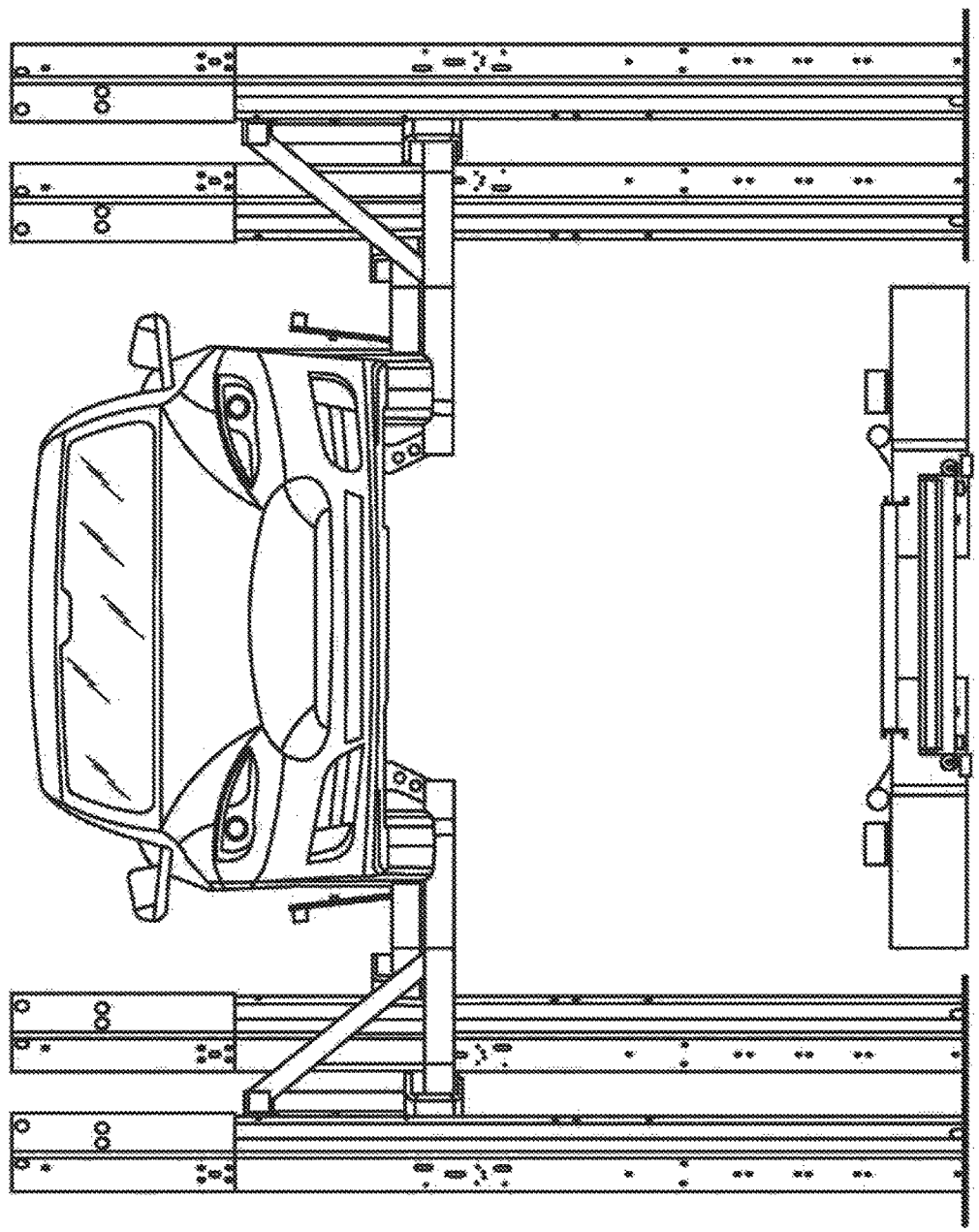
Figure 22:
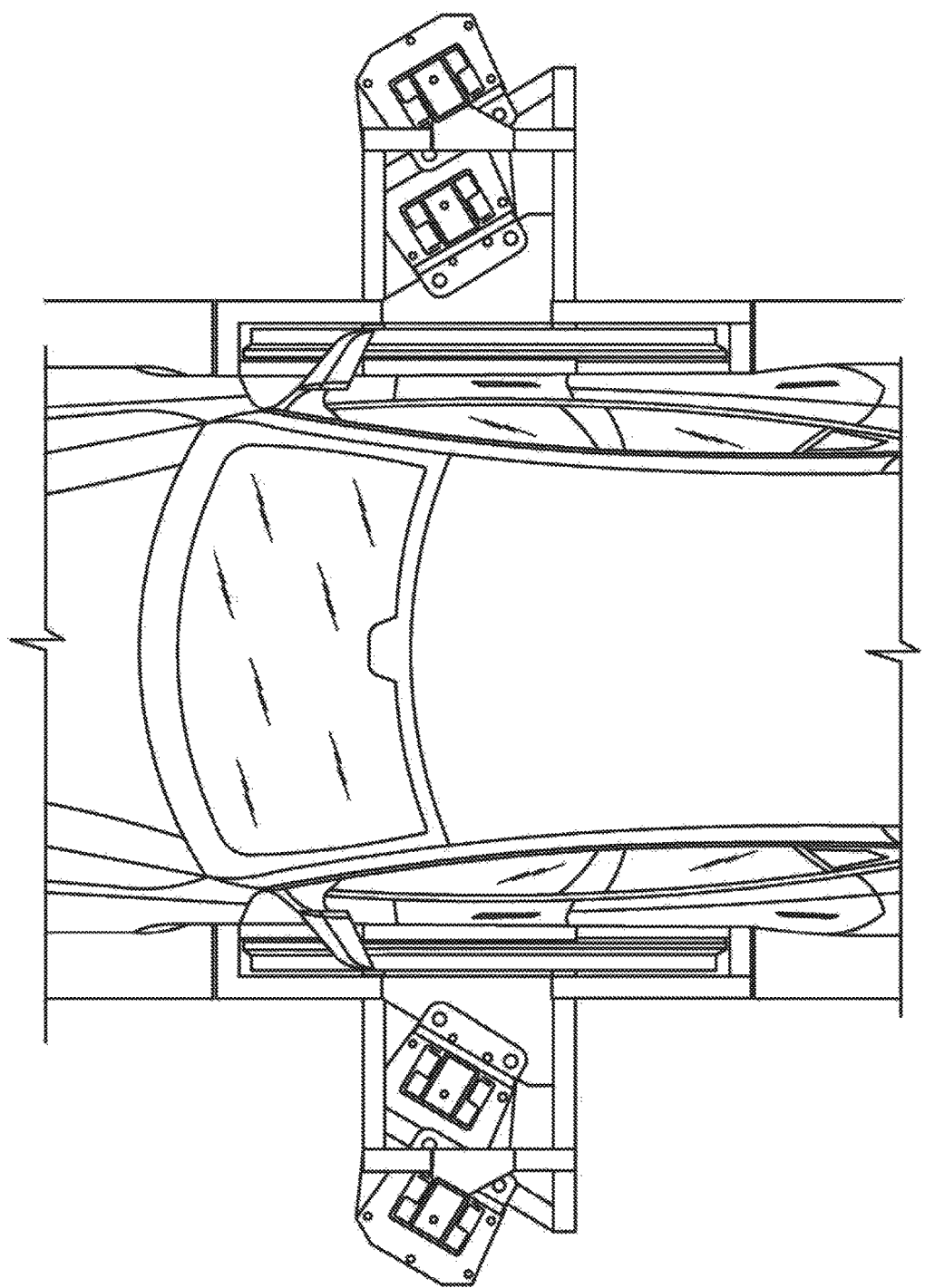
Figure 23:
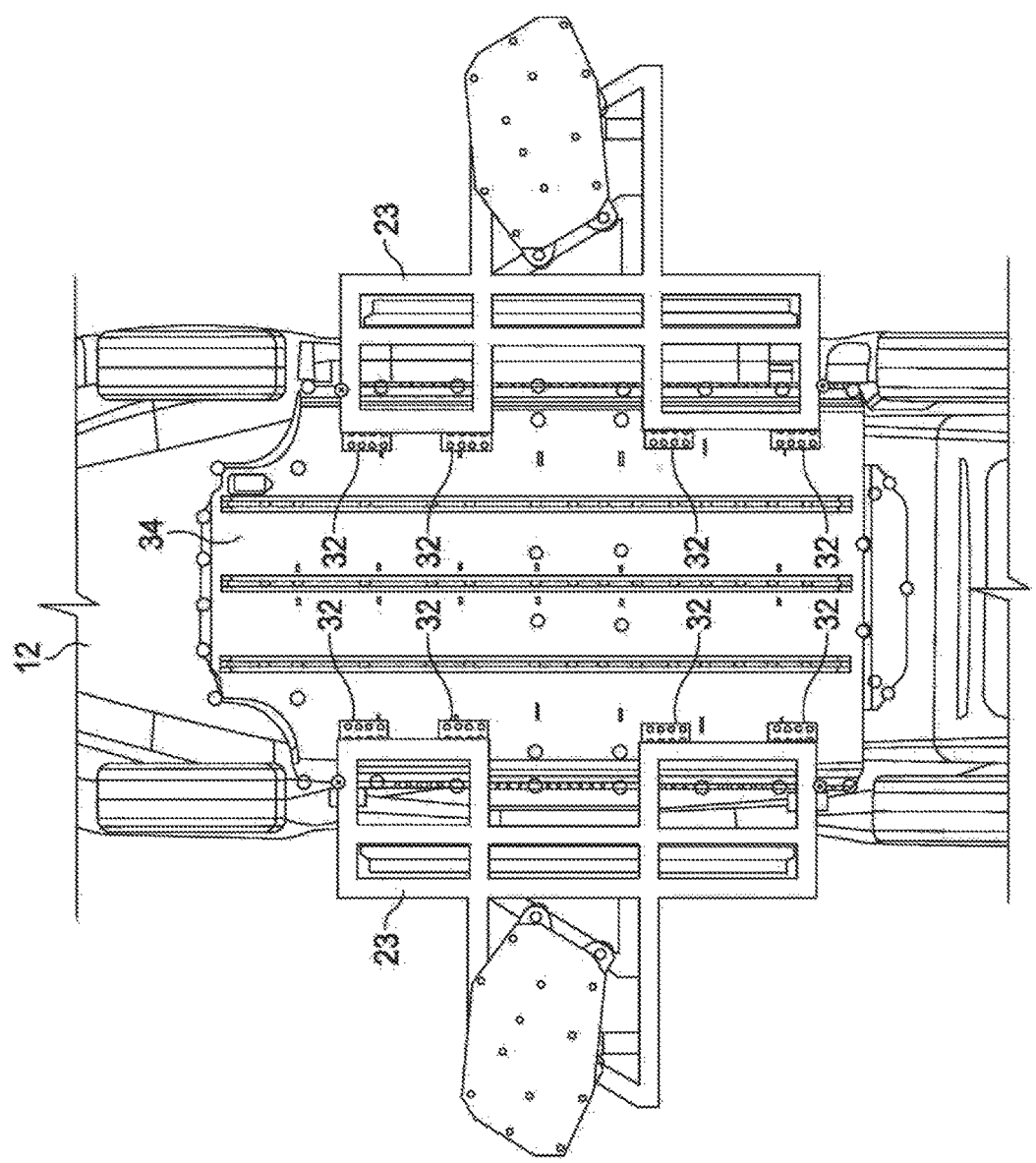
FIG. 23 shows that the battery lift can have ball transfer pads supporting the battery.

FIG. 19 shows that the system is ready to raise the battery lift (here, the outboard lifts 16). FIGS. 20-22 show that the battery lift has been raised until it touches the underside of the battery pack, so as to support the battery pack for removal. FIG. 23 shows that the battery lift can have ball transfer pads 32 supporting the battery 34 attached to and extending from battery support structures 23. As shown in FIGS. 19, 20 and 23, battery support structures 23 extend beneath vehicle 12 and battery 34, and around inboard lifts 14 (see also FIG. 11). FIG. 20 also shows horizontal doors 20 attached to support structures 23 and extending through lifting arms 26 of inboard lifts 14, and on either side of vehicle 12, once the battery lift has been raised. Lances can be inserted through openings in the lift frame to secure the battery to the lift.

Figure 24:
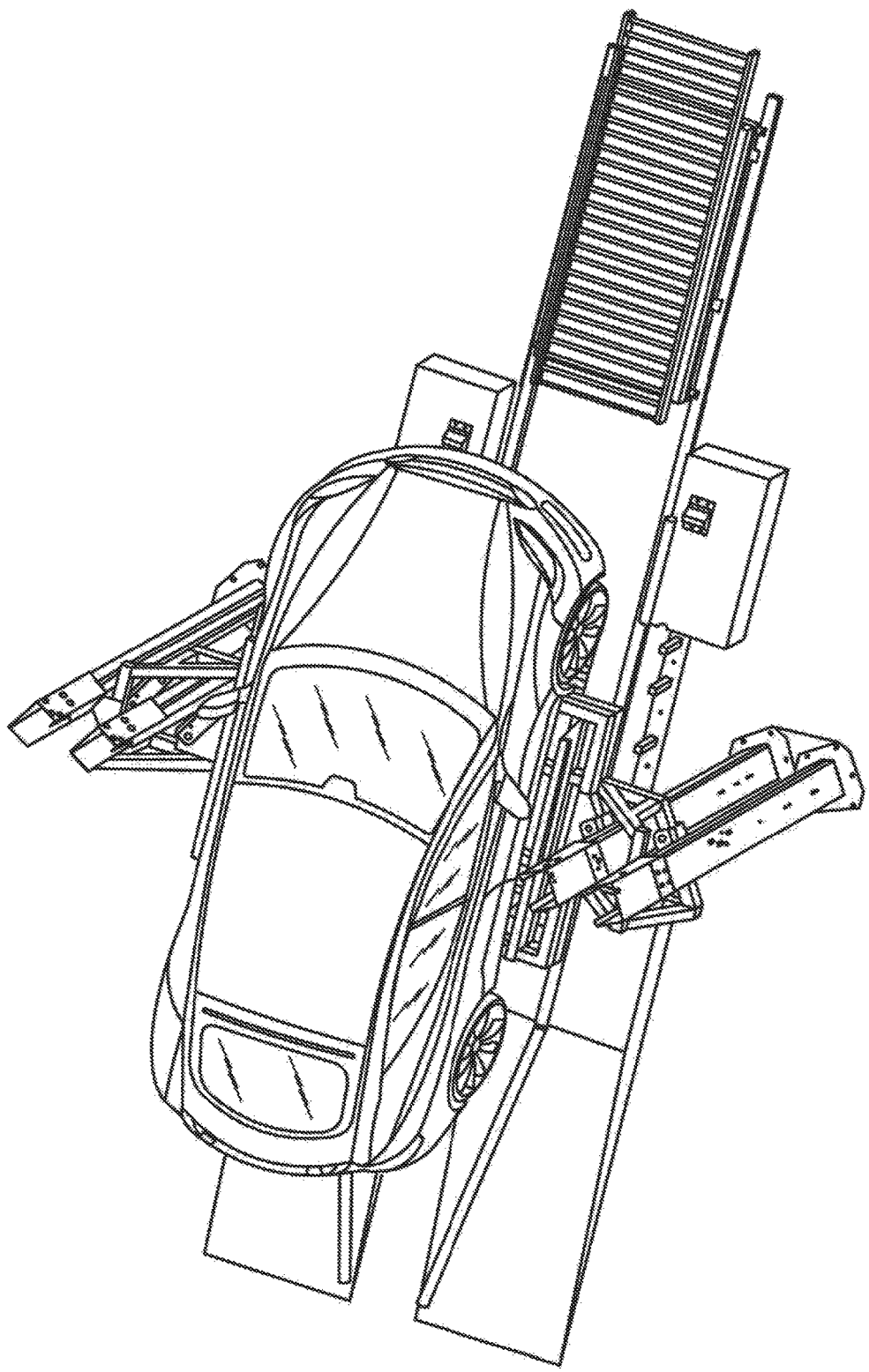
FIG. 24 shows that after the battery lift is correctly positioned to support the battery pack, fastener removal can begin.

FIG. 24 shows that after the battery lift is correctly positioned to support the battery pack, fastener removal can begin. In some implementations, this task is performed by human operators, for example using torque control devices (e.g., nutrunners) to remove bolts that secure the battery pack to the vehicle. In other implementations, automated equipment can be mounted on the battery lift (e.g., dedicated nutrunners for the respective bolt positions, or one or more robots that moves a nutrunner between at least two bolt positions).

Figure 25:
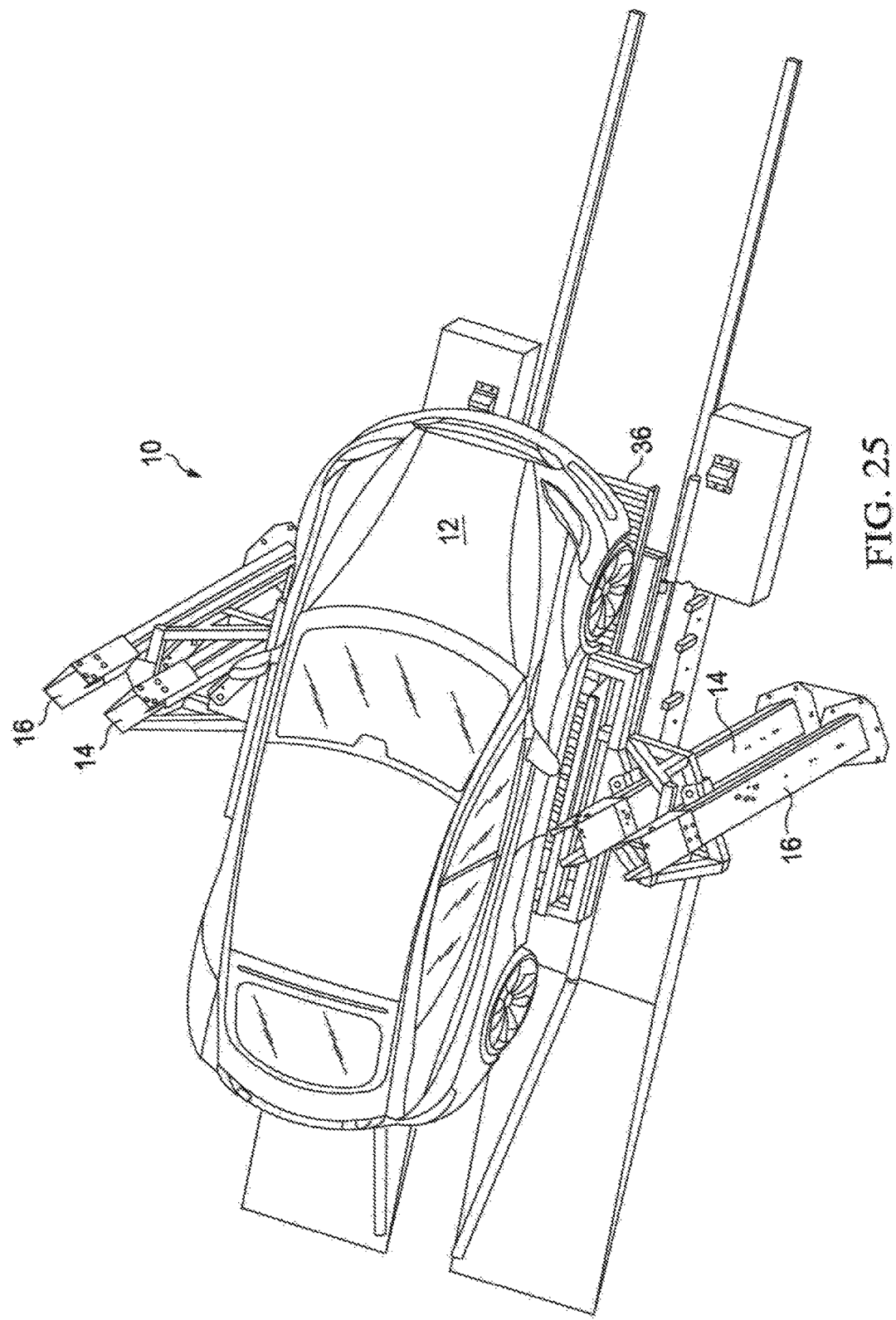
FIG. 25 shows that a battery conveyor shuttle is brought underneath the vehicle.
Figure 26:
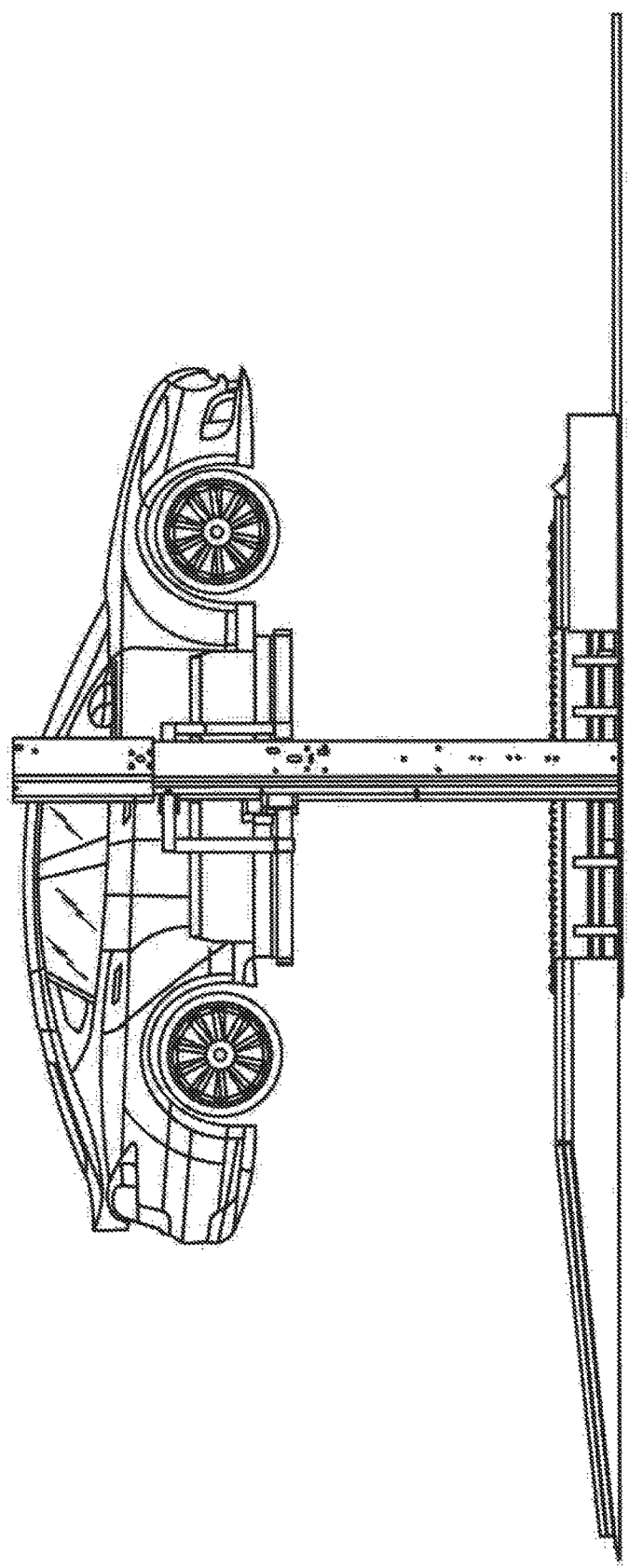
FIG. 26 shows that the system is ready to lower the battery (on the battery lift) onto the conveyor shuttle.
Figure 27:
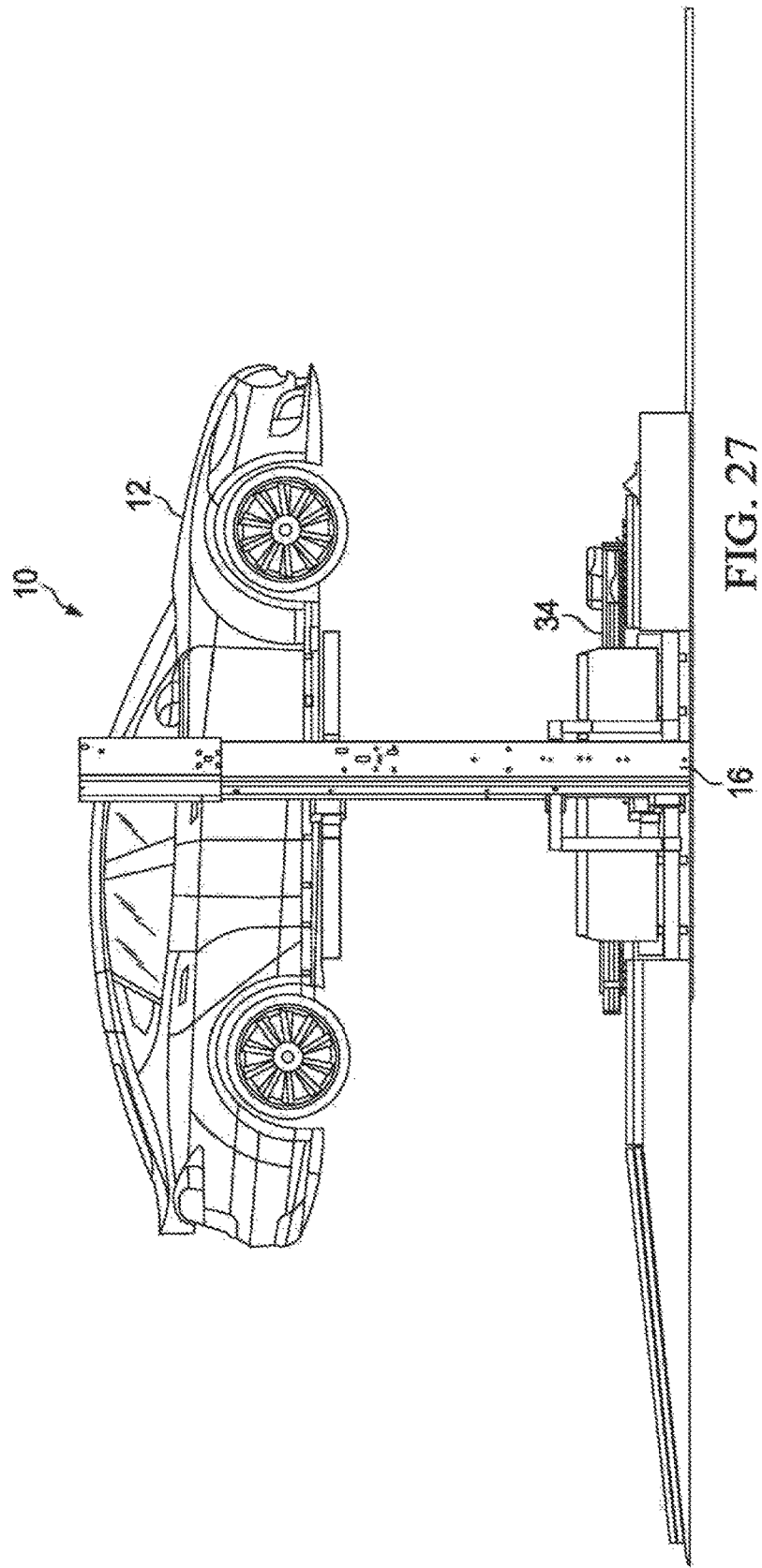
FIG. 27 shows that the battery lift with the battery has been lowered.

FIG. 25 shows that a battery conveyor shuttle 36 is brought underneath the vehicle. FIG. 26 shows that the system is ready to lower the battery (on the battery lift) onto the conveyor shuttle. FIG. 27 shows that the battery lift with the battery 34 has been lowered.

Figure 28:
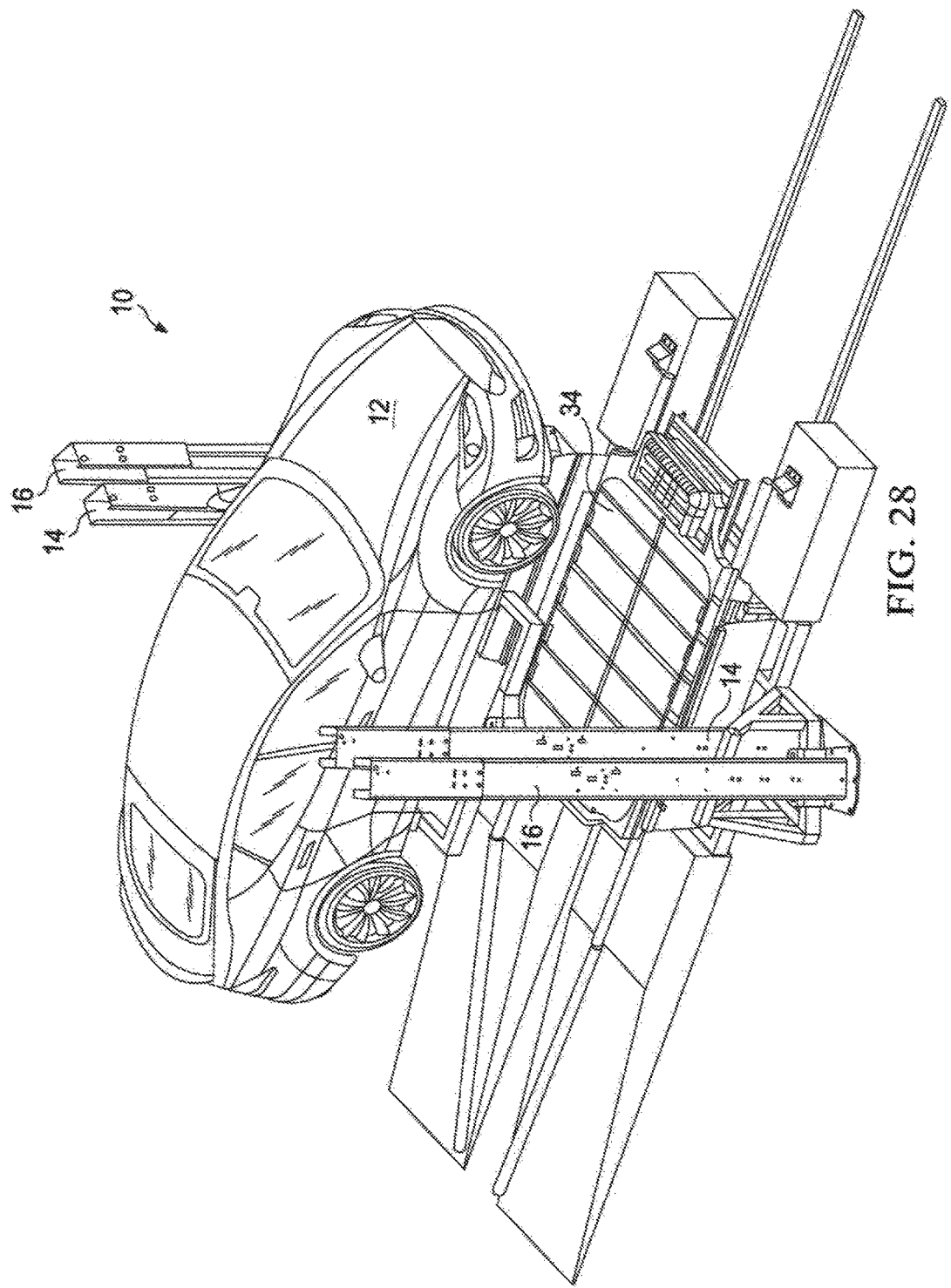
FIG. 28 shows that the system is ready to move the used battery away from the vehicle and bring in a fresh one.
Figure 29:
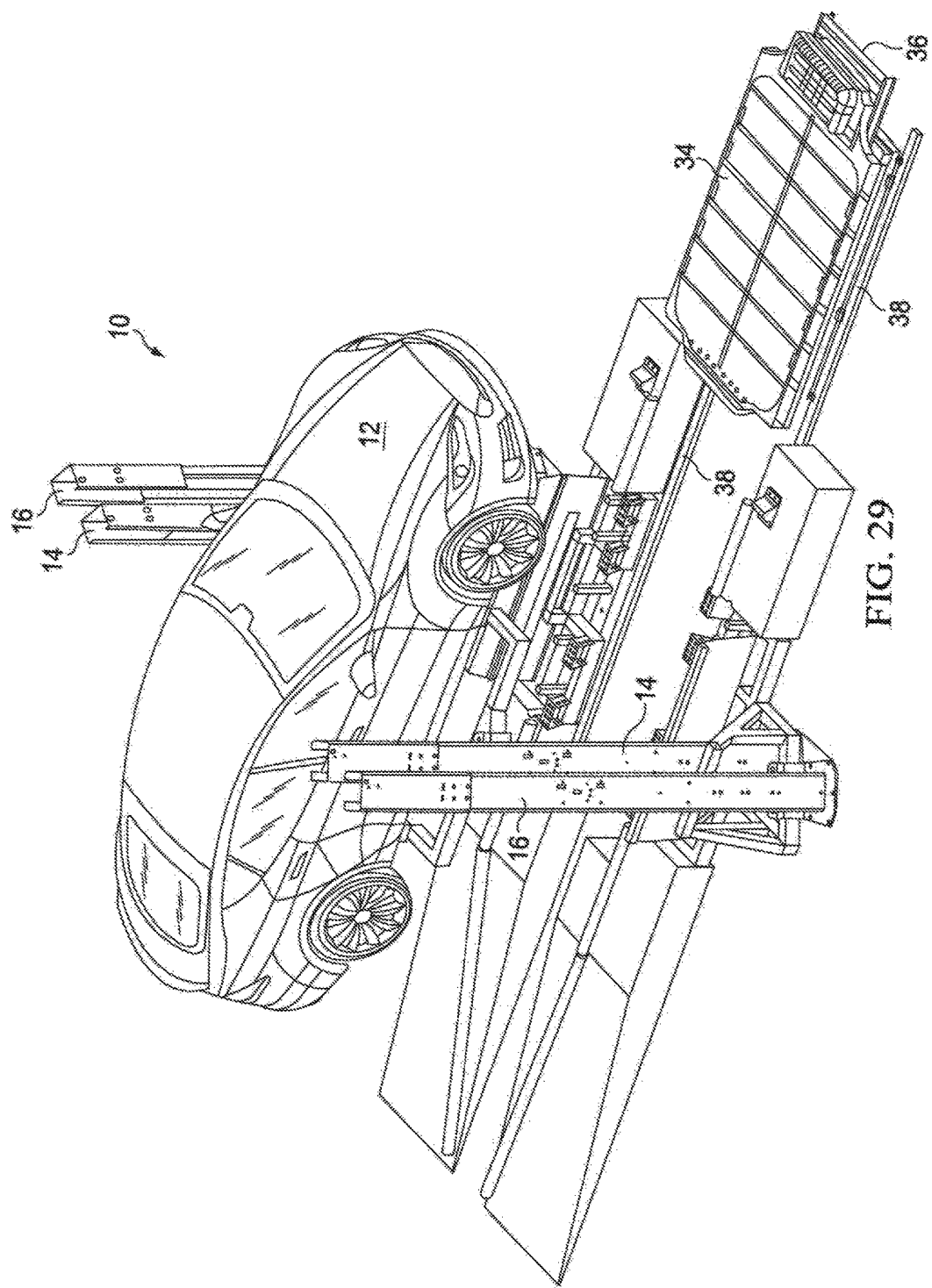
FIG. 29 shows that the used battery is being removed on the conveyor shuttle.
Figure 30:
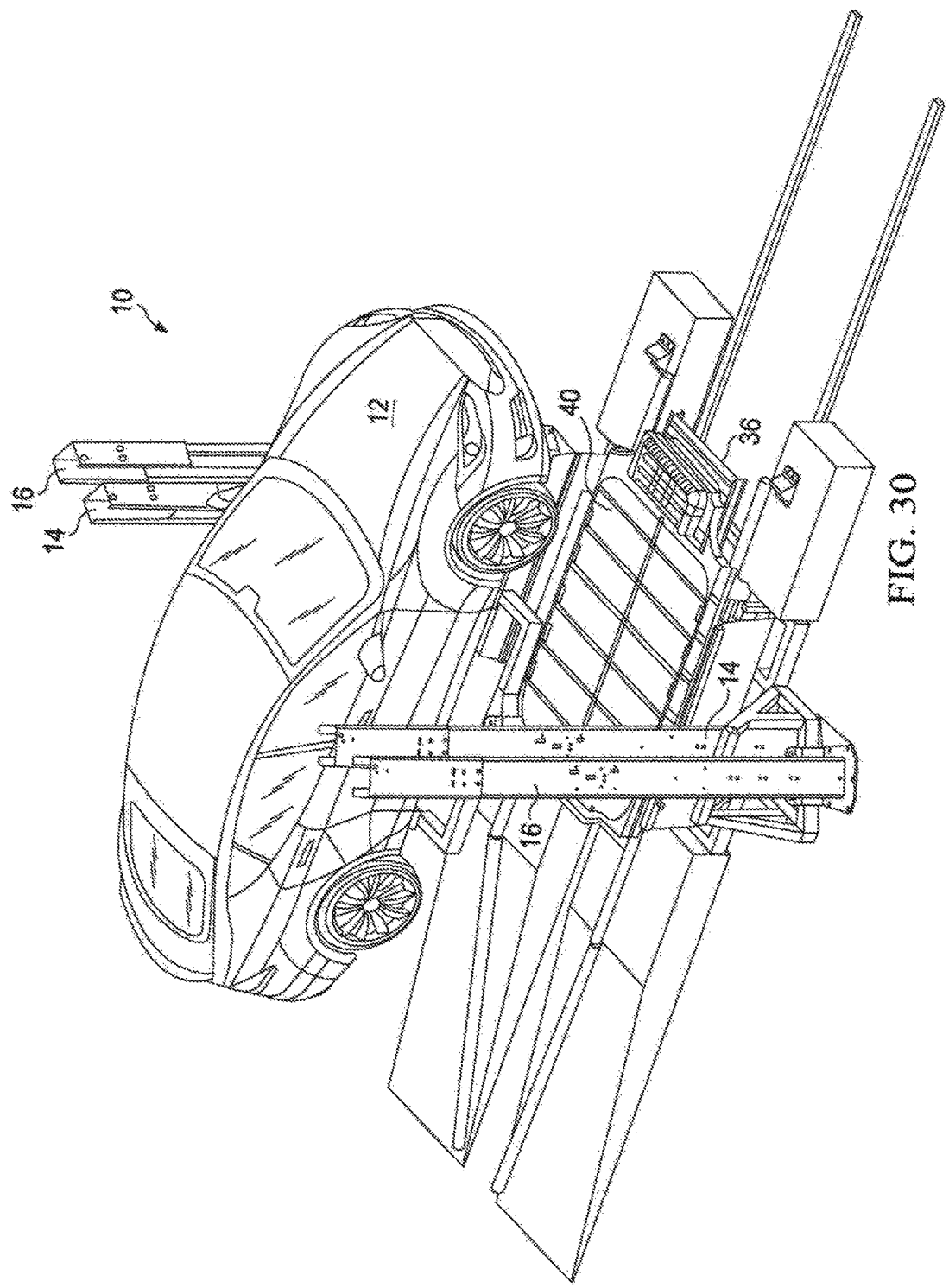
FIG. 30 shows that the fresh battery has been brought underneath the vehicle on a conveyor shuttle.

FIG. 28 shows that the system is ready to move the used battery 34 away from the vehicle 12 and bring in a fresh one. FIG. 29 shows that the used battery 34 is being removed on the conveyor shuttle 36. For example, the shuttle can have wheels that run on rails or other tracks 38 on the floor. The used battery is placed in a designated position for being recharged, and/or serviced as necessary, and stored until the next use. For example, the used battery can be transferred from the conveyor shuttle onto a scissor lift, such as using rollers on top of the shuttle and the lift. FIG. 30 shows that the fresh battery 40 has been brought underneath the vehicle on a conveyor shuttle 36. For example, the fresh battery 40 may earlier have been sitting on a scissor lift, and have been transferred from there onto the conveyor shuttle 36. The conveyor shuttle 36 for the fresh battery 40 can be the same shuttle as removed the used battery, or a separate shuttle.

Figure 31:
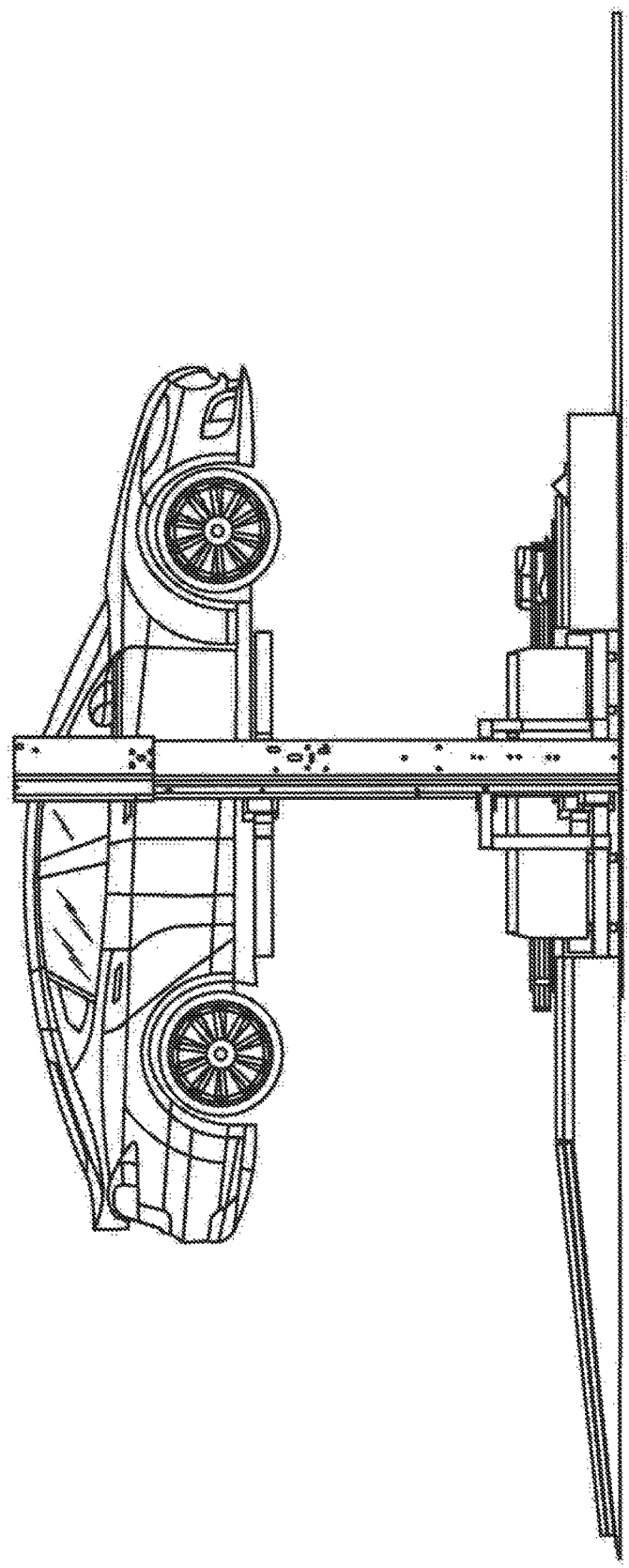
FIG. 31 shows that the system is ready to raise the fresh battery into the vehicle.
Figure 32:
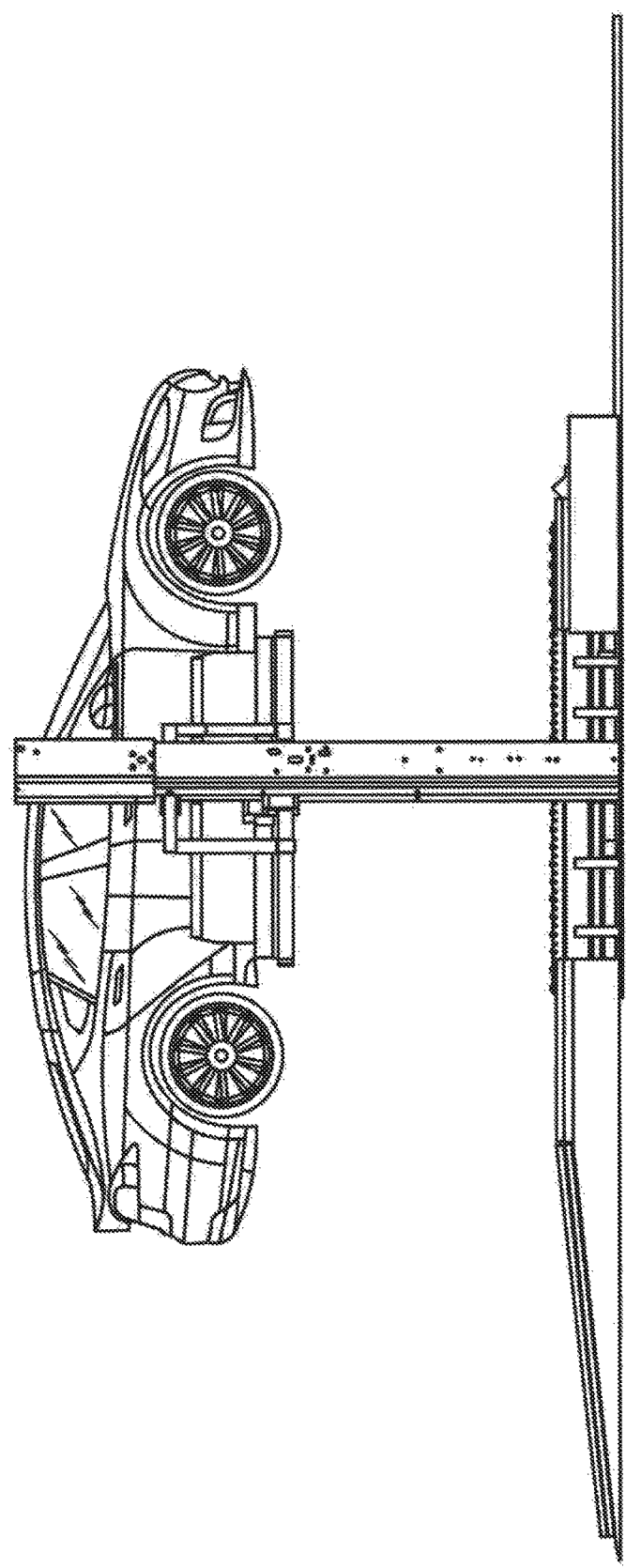
FIG. 32 shows that the fresh battery has been raised into contact with the vehicle.
Figure 33:
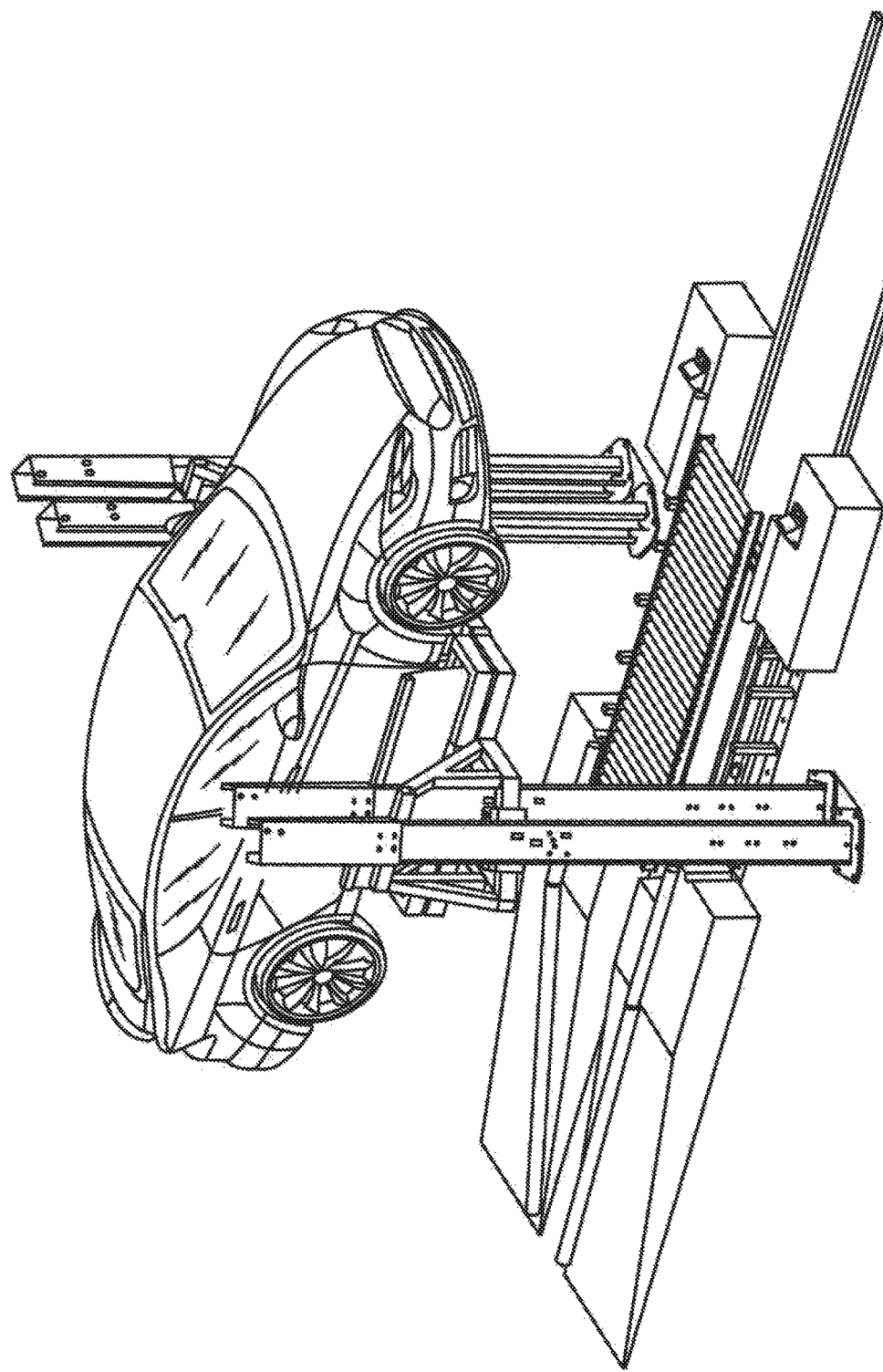
FIG. 33 shows that the system is ready to return the conveyor shuttle to the staged position.
Figure 34:
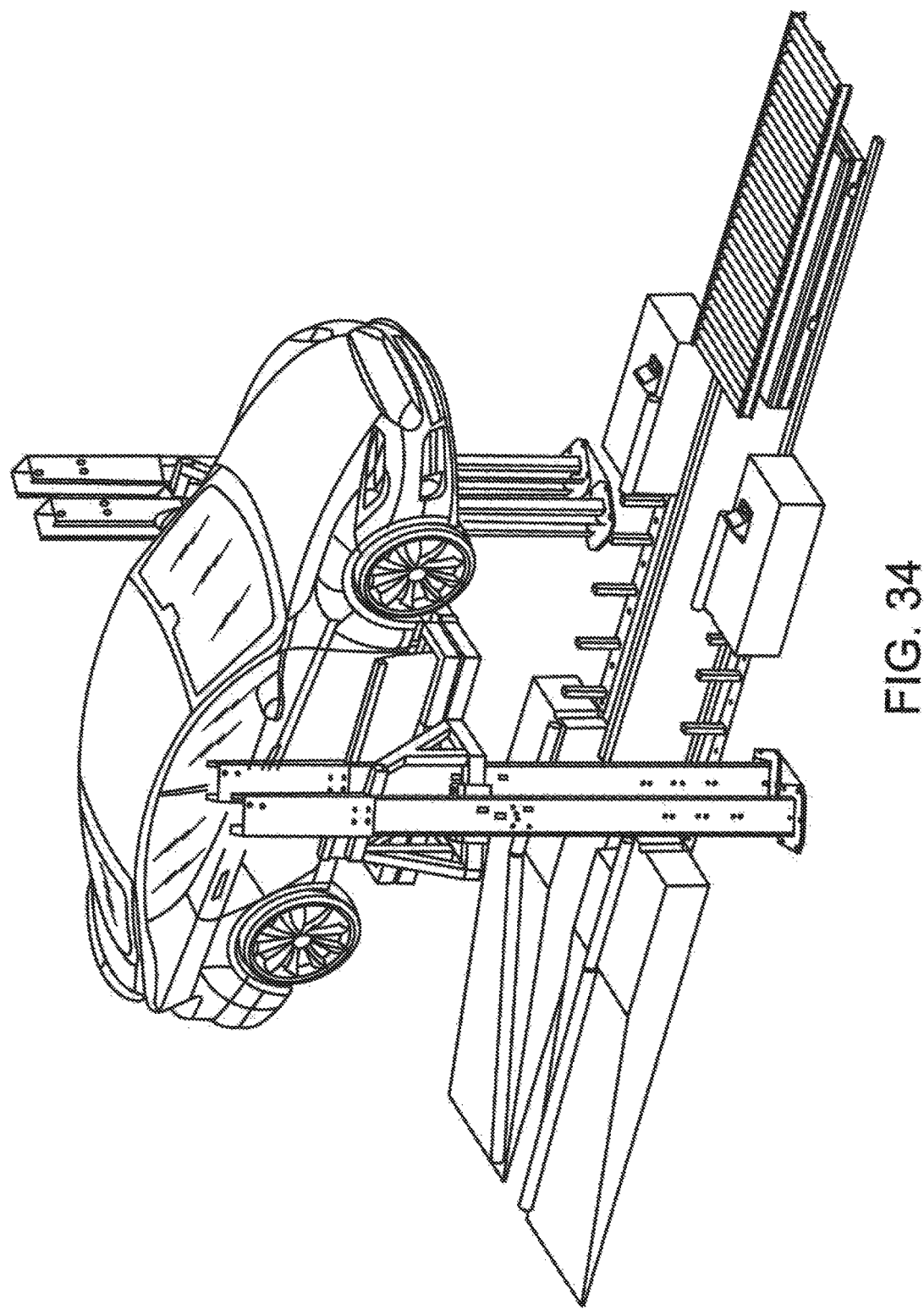
FIG. 34 shows that the shuttle is being so returned.

FIG. 31 shows that the system is ready to raise the fresh battery into the vehicle. FIG. 32 shows that the fresh battery has been raised into contact with the vehicle. FIG. 33 shows that the system is ready to return the conveyor shuttle to the staged position, and FIG. 34 shows that the shuttle is being so returned.

Figure 35:
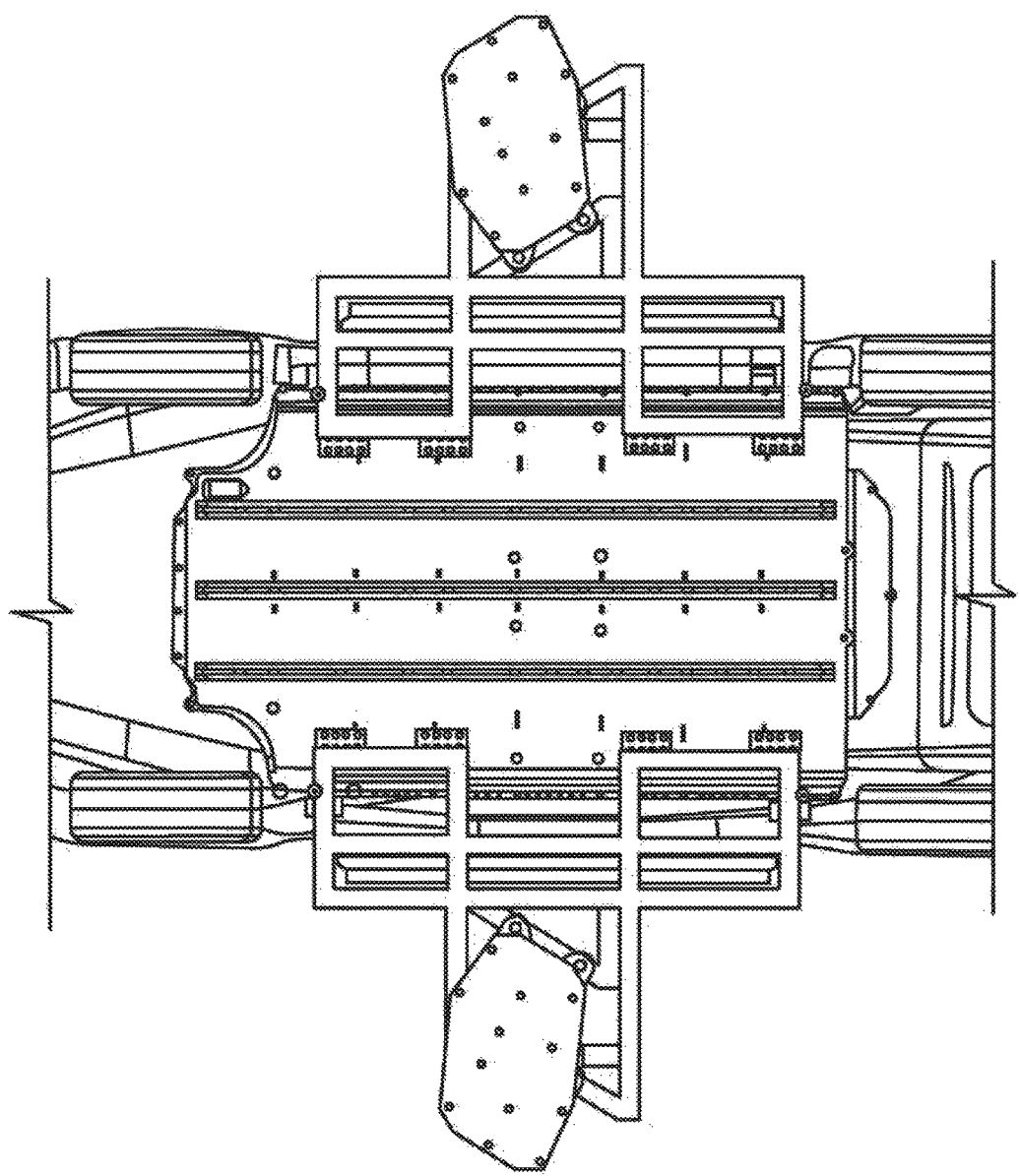
FIG. 35 shows that the fresh battery is being supported by the ball transfer pads.
Figure 36:
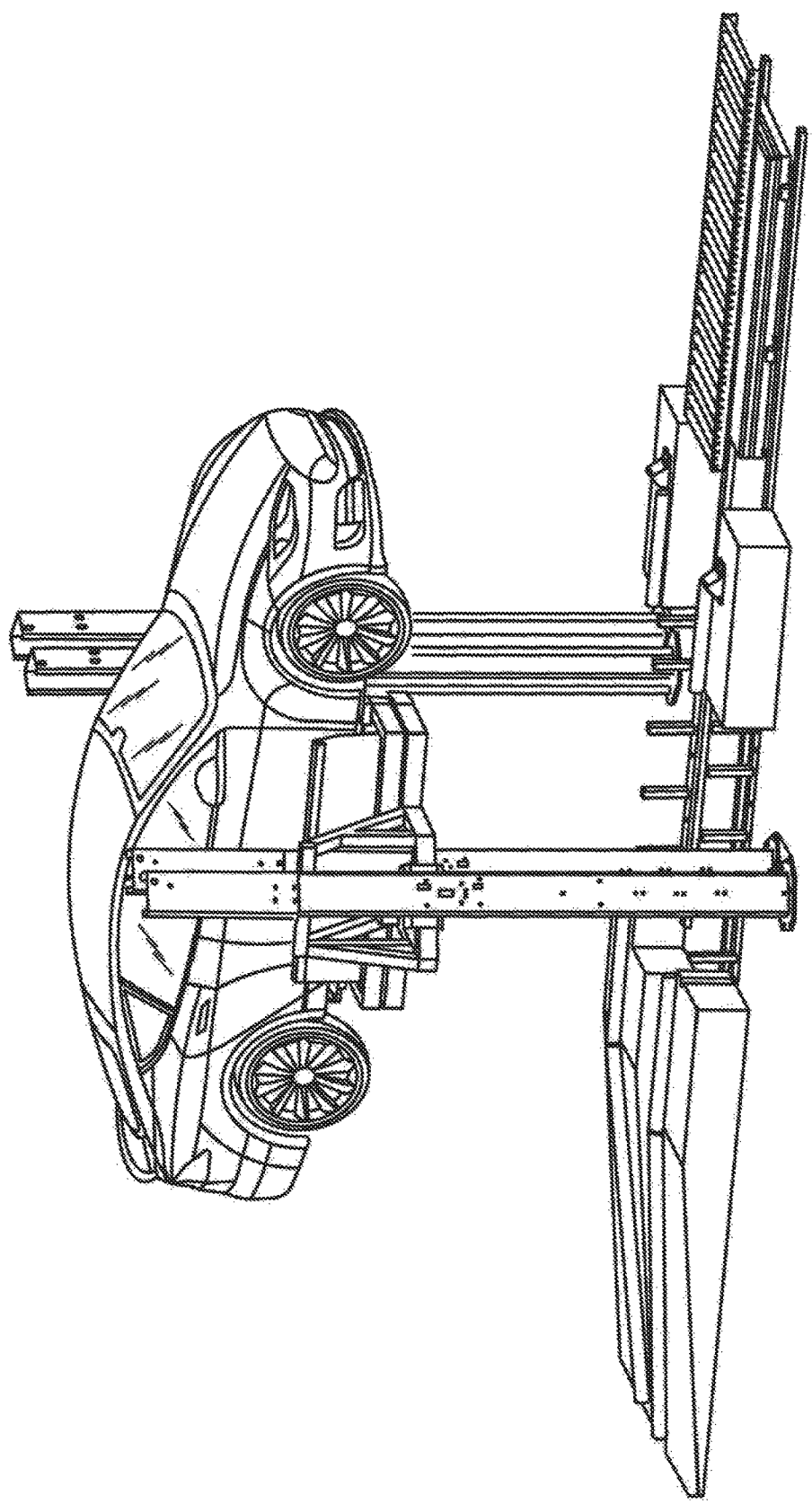
FIG. 36 shows that the battery pack fasteners (e.g., bolts) are fastened (e.g., torqued to specifications).

FIG. 35 shows that the fresh battery is being supported by the ball transfer pads. Lances can be used to align the battery with the rest of the vehicle (here referred to as body-in-white, or BIW). FIG. 36 shows that the battery pack fasteners (e.g., bolts) are fastened (e.g., torqued to specifications). For example, this can be done by one or more human operators, or by automated equipment.

Figure 37:
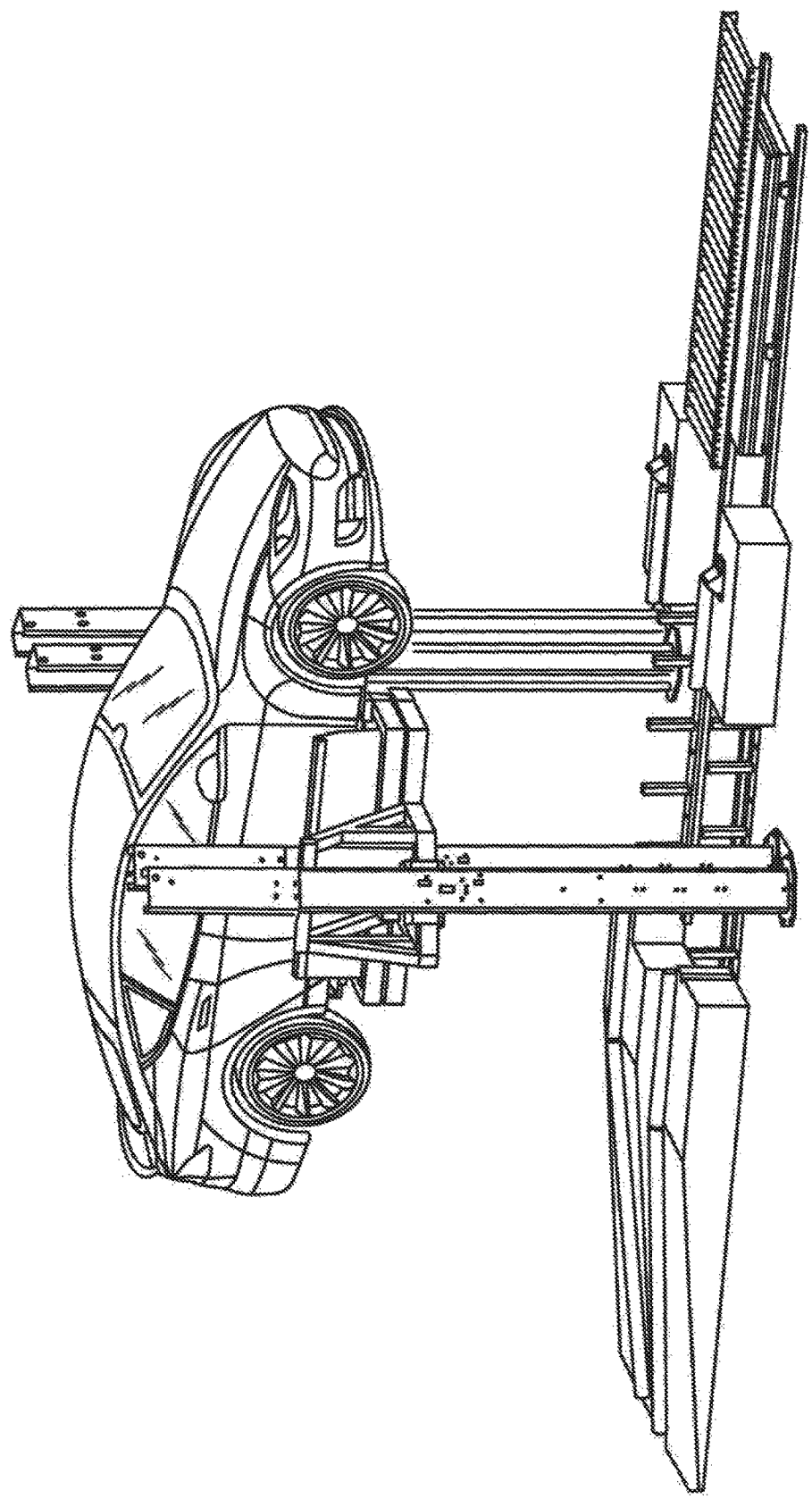
FIG. 37 shows that the system is ready to lower the battery lift.
Figure 38:
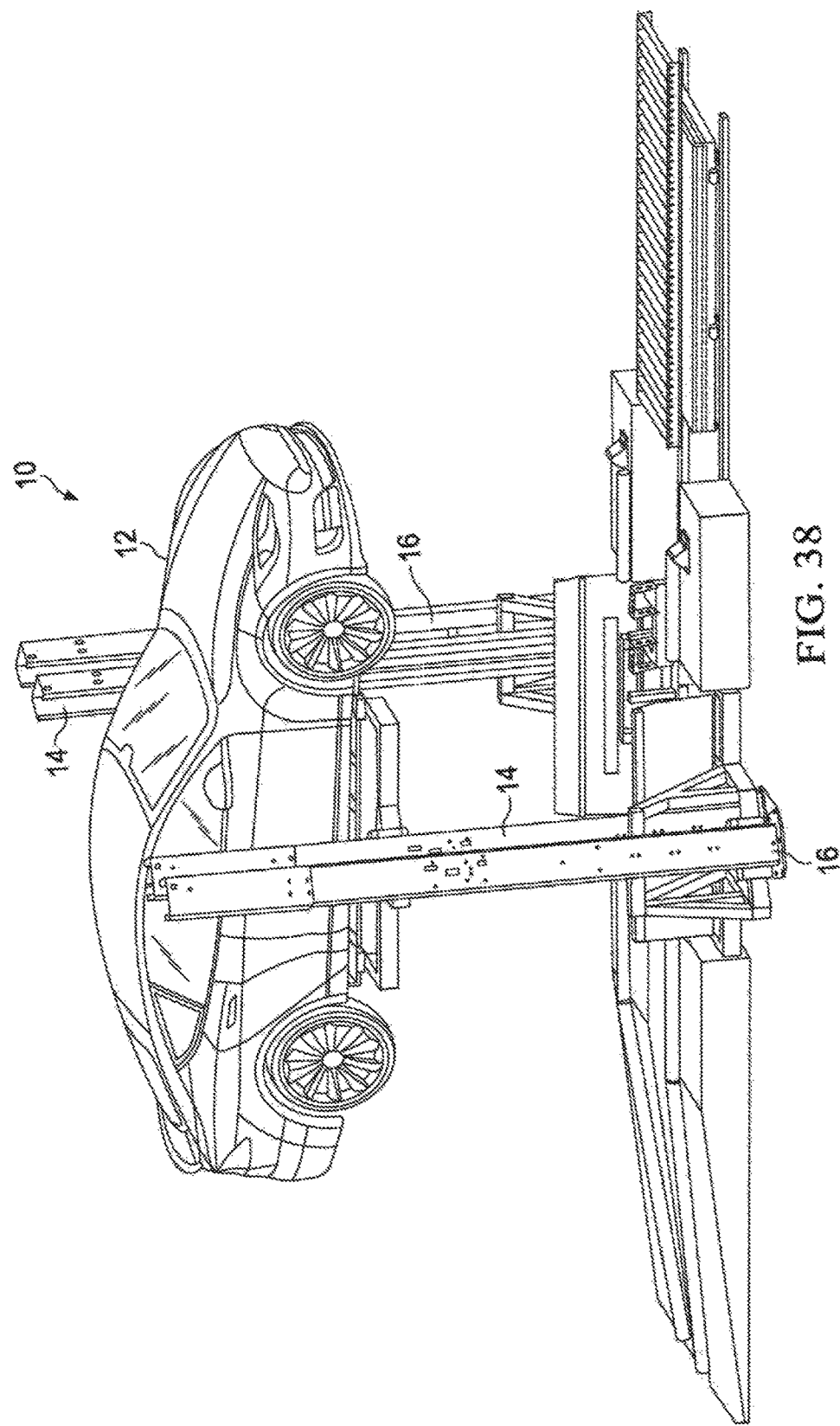
FIG. 38 shows that the battery lift has been lowered.
Figure 39:
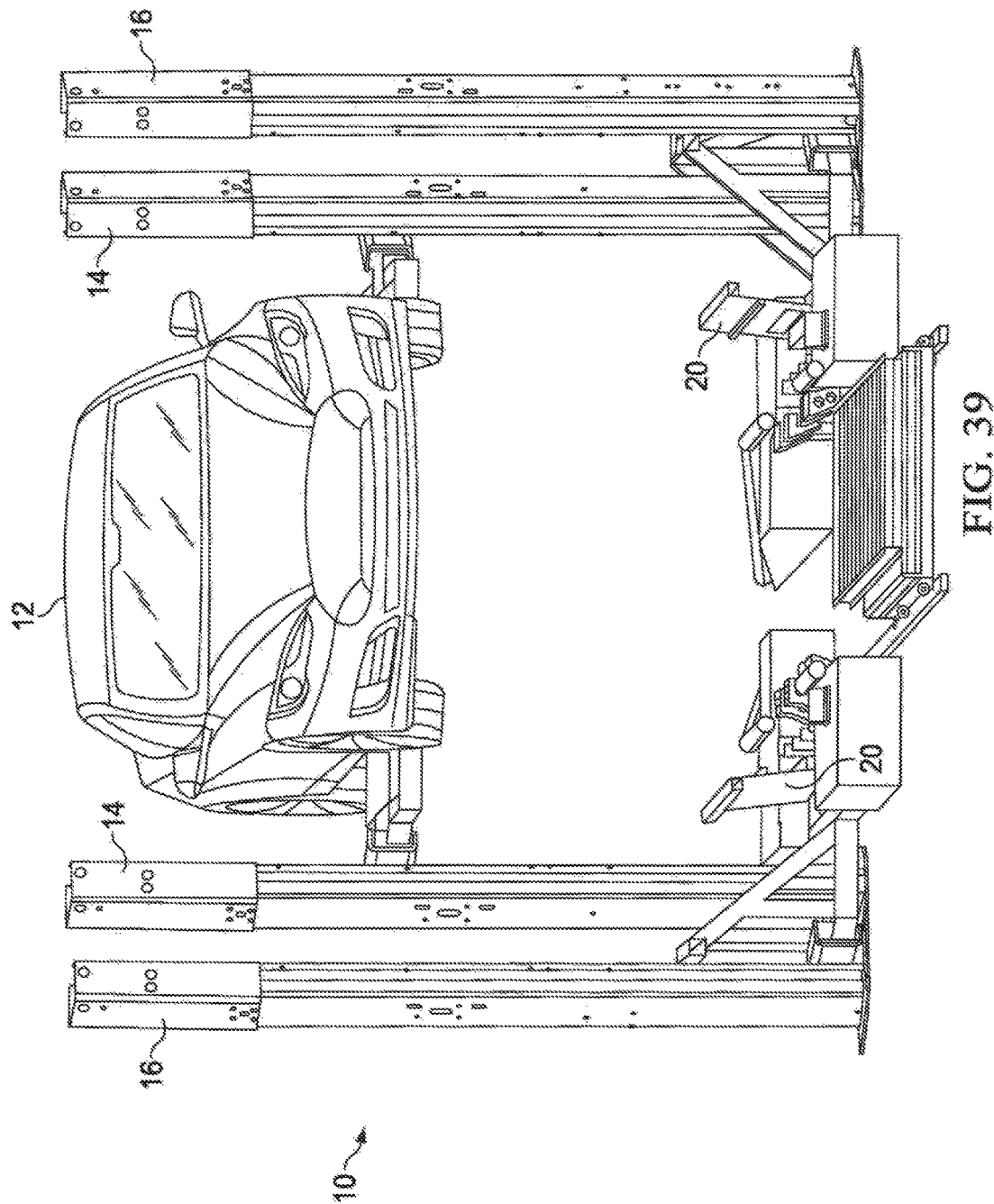
FIG. 39 shows that the system is ready to close the battery lift doors.
Figure 40:
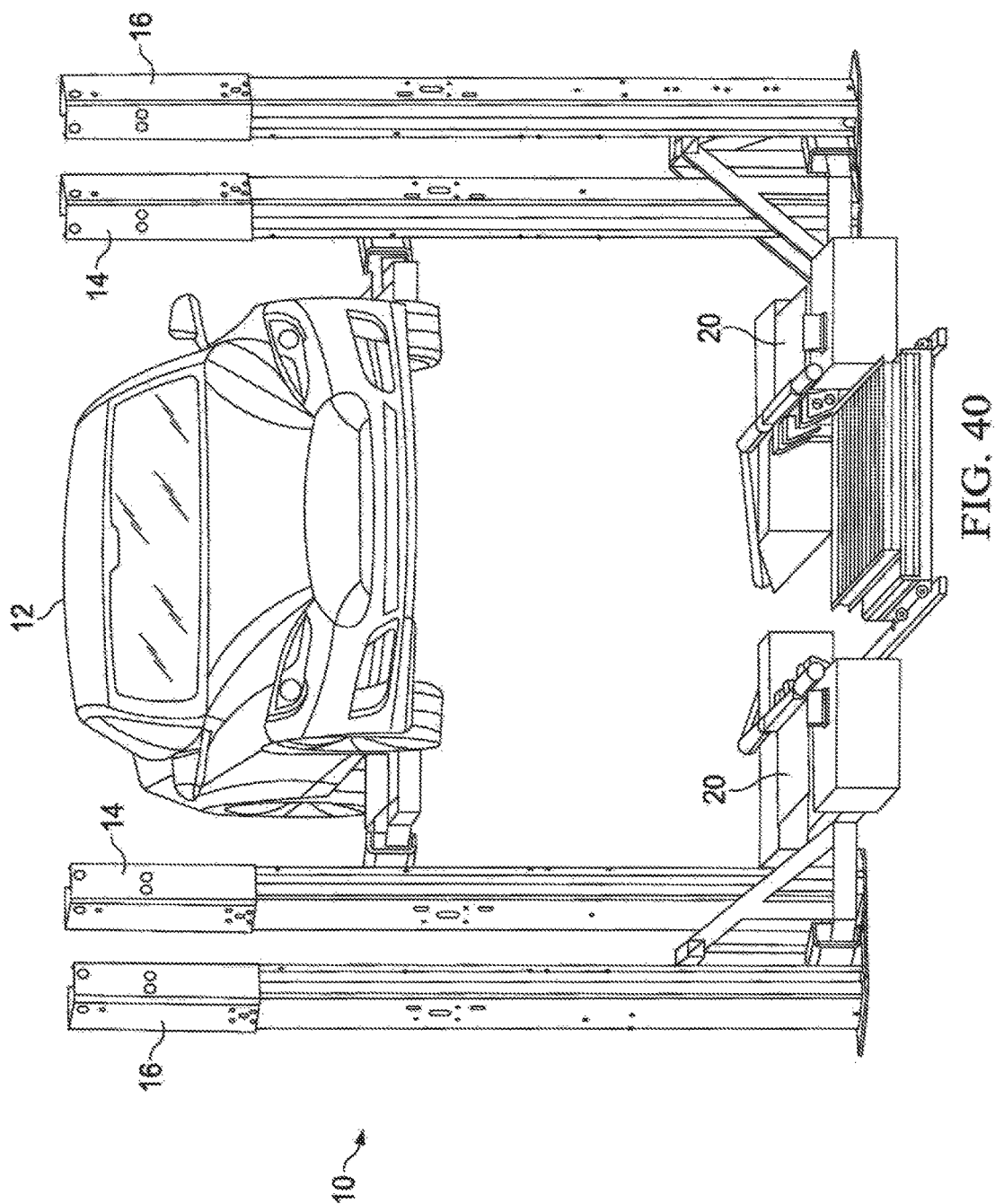
FIG. 40 shows that the battery lift doors have been closed.

FIG. 37 shows that the system is ready to lower the battery lift. FIG. 38 shows that the battery lift (outboard lifts 16) has been lowered. FIG. 39 shows that the system is ready to close the horizontal doors (also known as battery lift doors) 20. FIG. 40 shows that the battery lift doors 20 have been closed.

Figure 41:
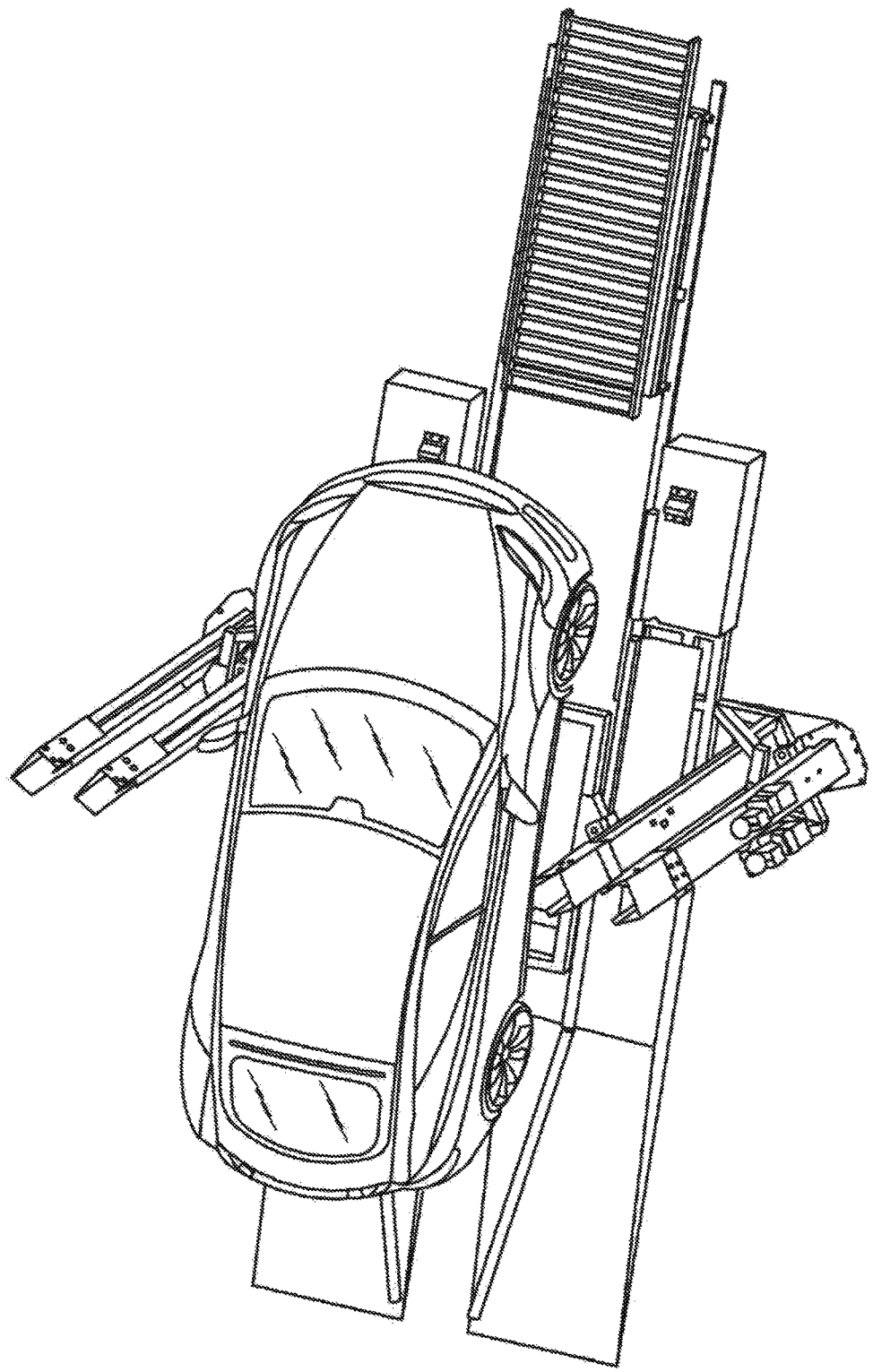
FIG. 41 shows that the system is ready to lower the vehicle lift.
Figure 42:
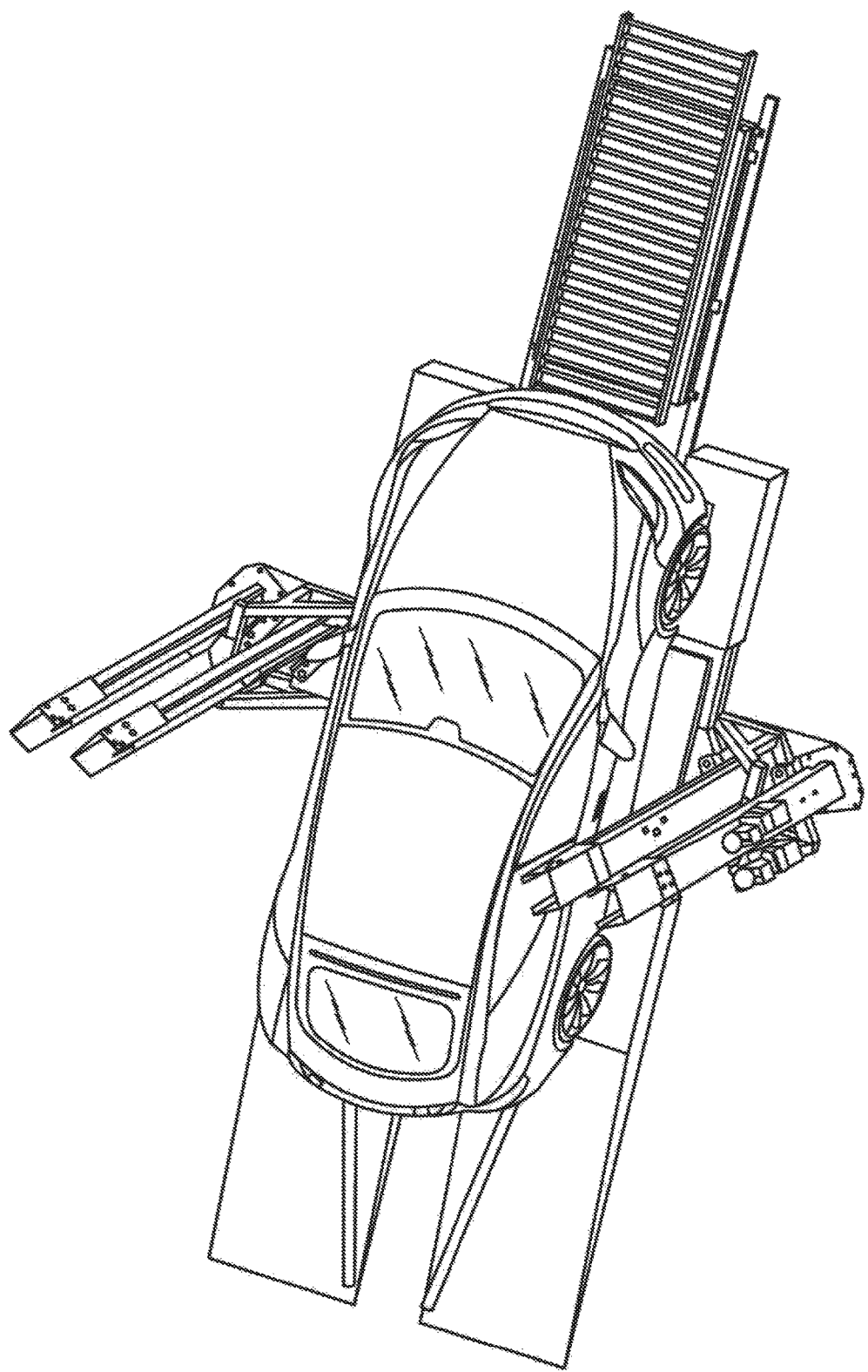
FIG. 42 shows that the vehicle lift has been lowered.
Figure 43:
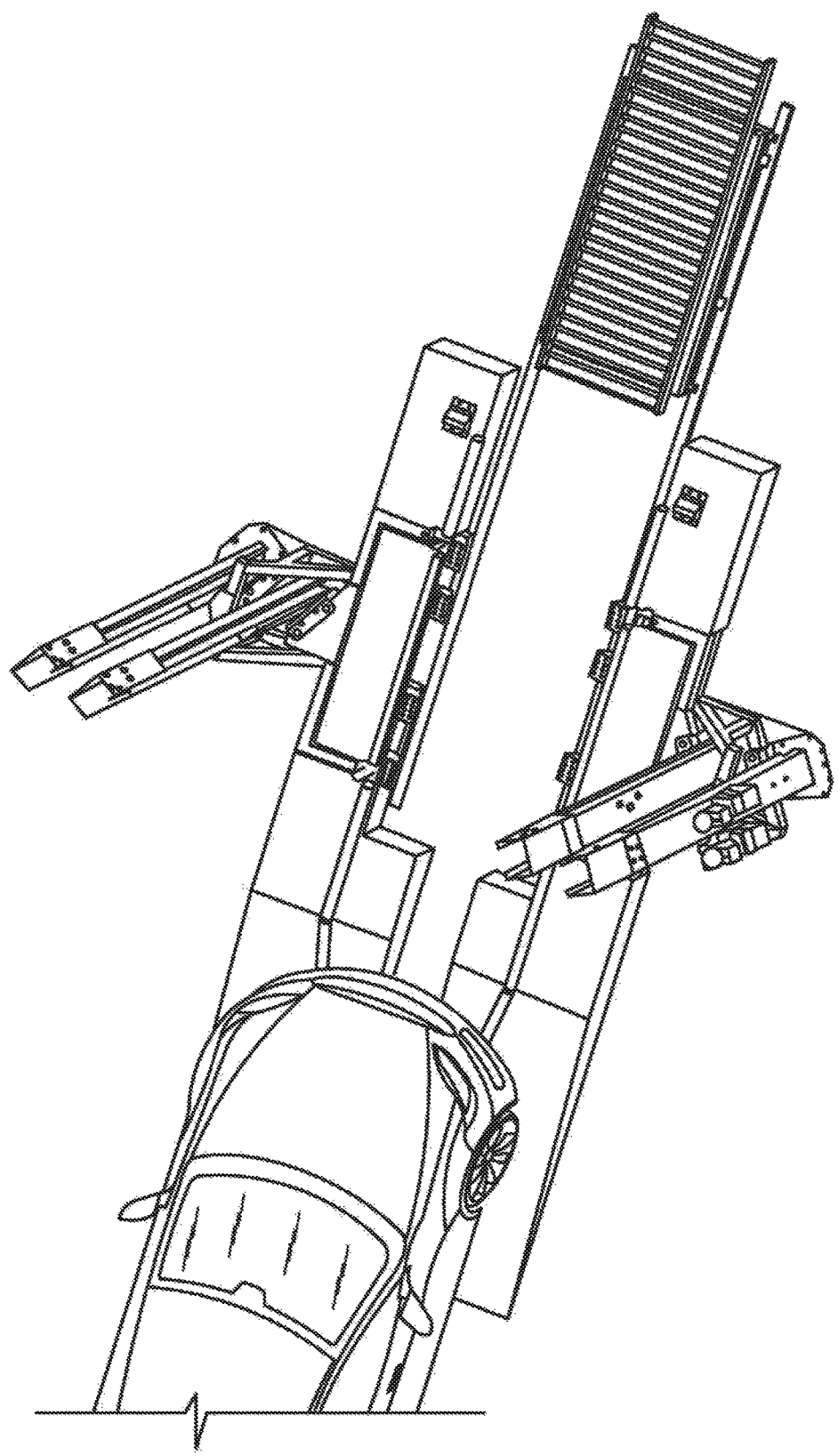
FIG. 43 shows that after having been lowered, the vehicle can turn on its power and the status of various systems in the vehicle can be confirmed (e.g., a 12V system and a high-voltage system).
Figure 44:
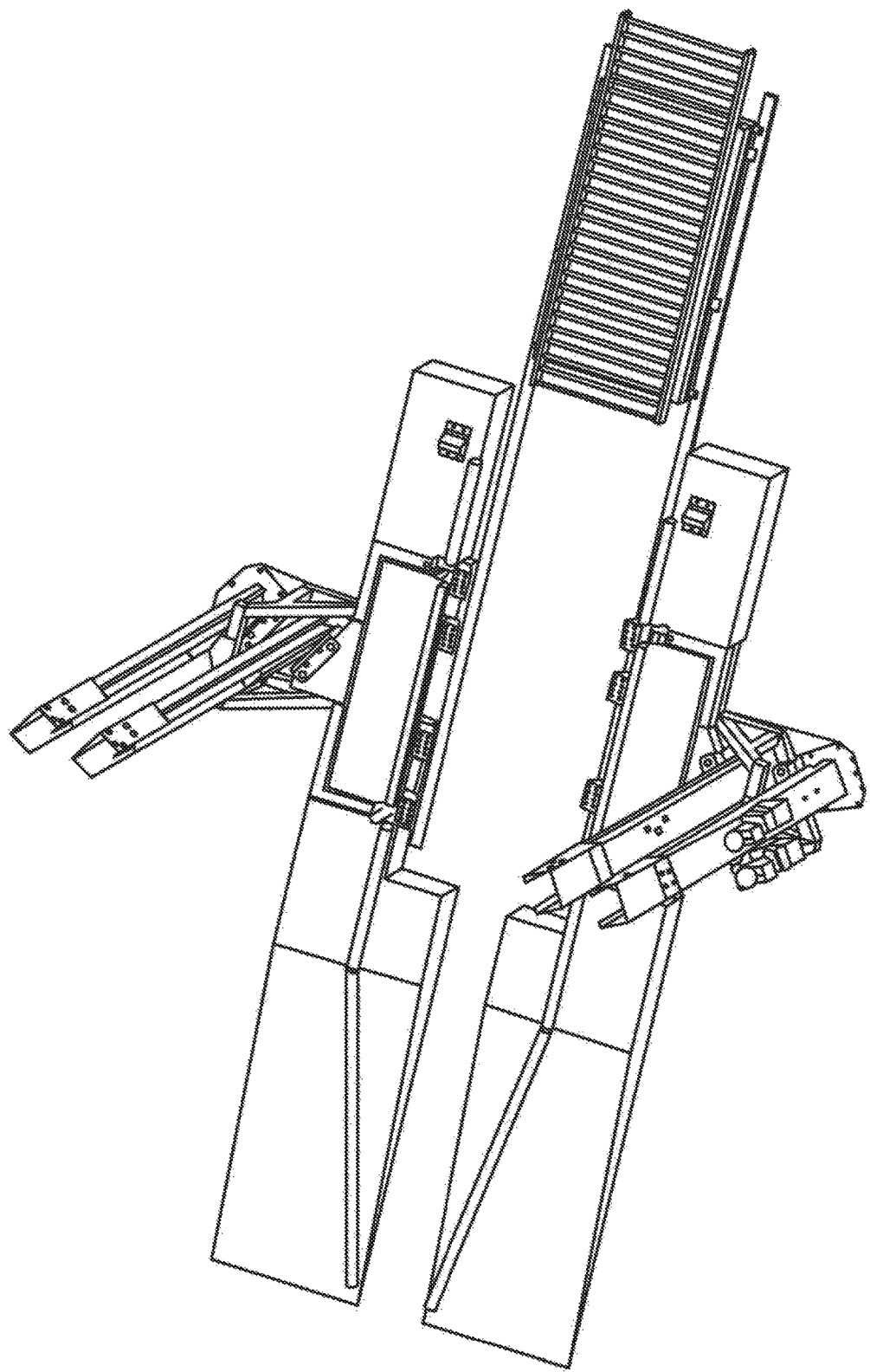
FIG. 44 shows the state of the system after a swap has been completed and before the next vehicle enters, which can be serviced using the same or a similar procedure.

FIG. 41 shows that the system is ready to lower the vehicle lift. FIG. 42 shows that the vehicle lift has been lowered. FIG. 43 shows that after having been lowered, the vehicle can turn on its power and the status of various systems in the vehicle can be confirmed (e.g., a 12V system and a high-voltage system). The vehicle can exit the changing station in reverse, opposite to the direction of entry. FIG. 44 shows the state of the system after a swap has been completed and before the next vehicle enters, which can be serviced using the same or a similar procedure.

Figure 45:
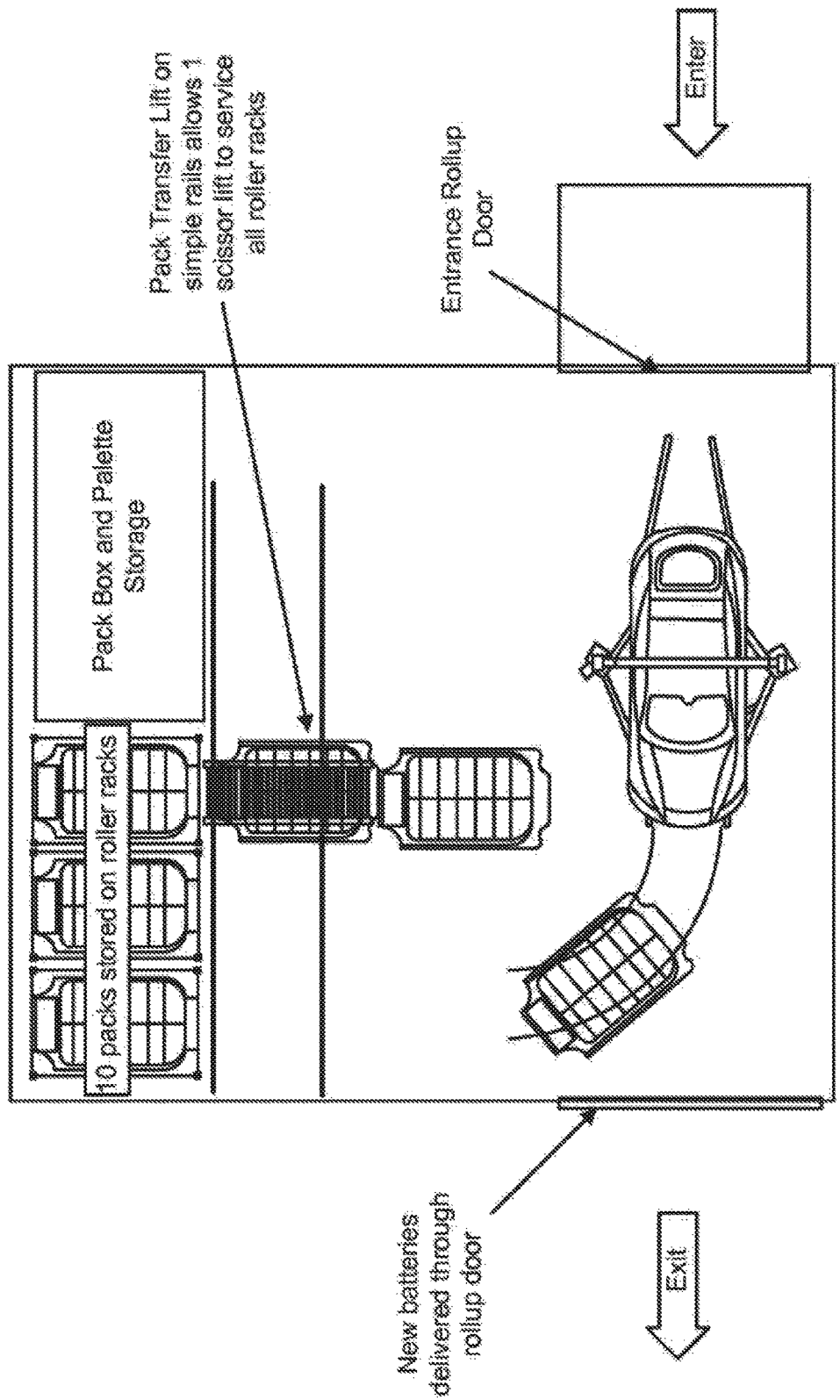
FIG. 45 shows that the station can have an entrance door, a vehicle lift mechanism inside the building, and an exit door.
Figure 46:
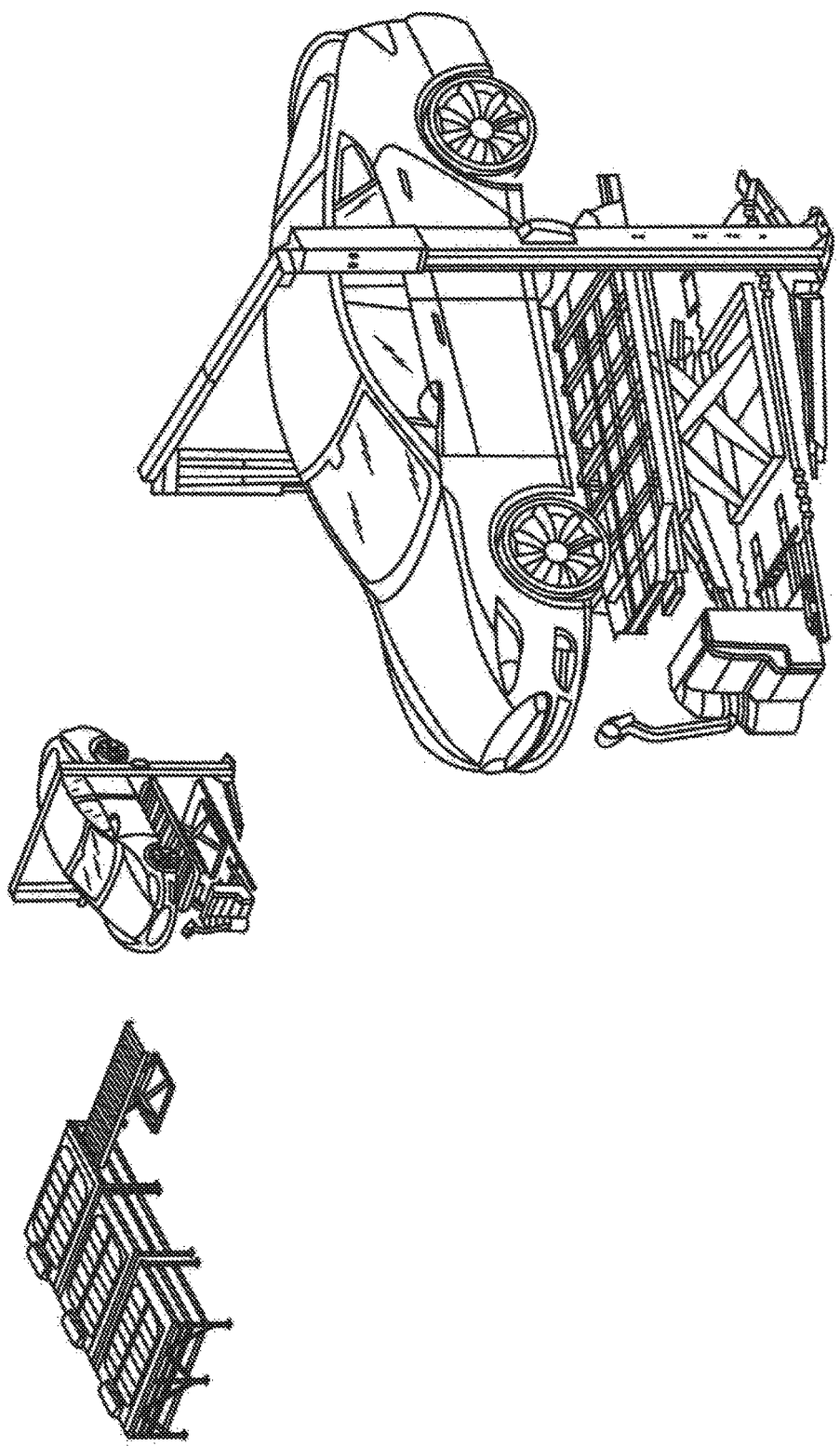
FIG. 46 shows that a forklift can be used to raise and lower the battery pack.
Figure 47:
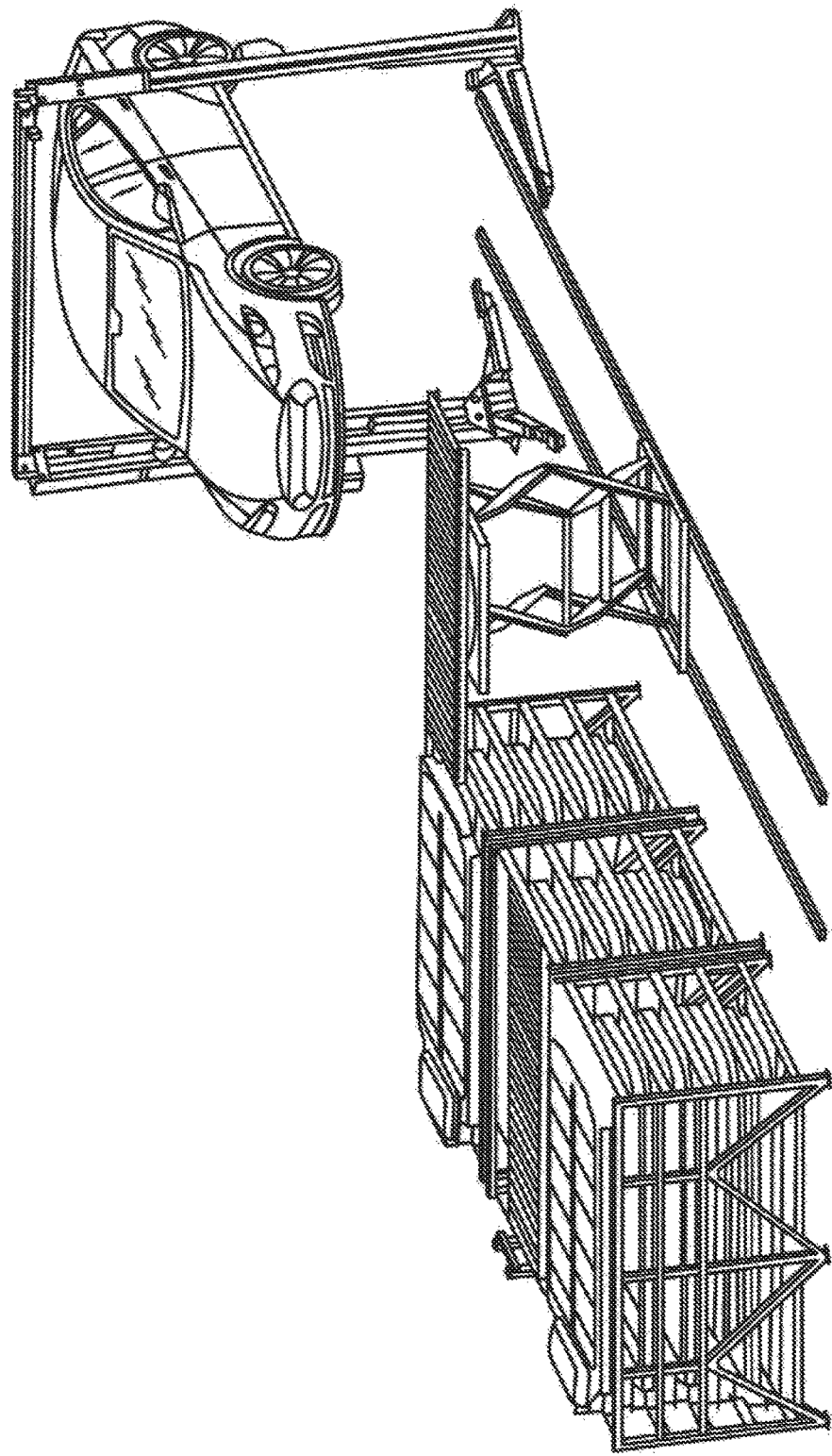
FIG. 47 shows that a moving device for battery packs can be positioned on rails in order to move between battery storage and the serviced vehicle.

FIGS. 45-47 show examples relating to a battery swapping station. FIG. 45 shows that the station can have an entrance door, a vehicle lift mechanism inside the building, and an exit door. Battery packs (used as well as fresh) can be stored on a rack. A scissor lift can bring battery backs between the vehicle and a pack transfer lift, which services the roller racks. FIG. 46 shows that a forklift can be used to raise and lower the battery pack. FIG. 47 shows that a moving device for battery packs can be positioned on rails in order to move between battery storage and the serviced vehicle. The device can have a turntable on top to provide rotation of the battery pack, as needed.

Lowering the battery pack can disconnect one or more couplings. One or more other disconnects can be used in some implementations. For example, separate quick disconnects can be used for respective high-voltage connection, low-voltage connection and a coolant connection. When the battery pack is successfully mounted onto the vehicle, any quick disconnects on the vehicle are then properly connected with corresponding disconnects on the new battery pack. This can ensure proper connection of high voltage, low voltage and liquid coolant to the vehicle. For example, the vehicle's internal system can check whether there is any water intrusion into the battery pack, or whether there are any short circuits. If no errors are detected, the system can close a connect that supplies the high voltage to the vehicle.

In some implementations, there is no direct communication by the battery-swapping system with the vehicle's internal computer systems. For example, when the vehicle is placed in Park mode and the battery pack is removed, the vehicle may present (e.g., display) a message to the user to obtain a service inspection. When the battery is restored (e.g., by swapping in a new battery), and the power is cycled on, the car can recognize that valid high-voltage power is available and can enter a normal operating mode. However, in other implementations, the battery-swapping system can communicate with the vehicle system(s) to remove such error signals. For example, the vehicle's detection whether proper power is available can be temporarily disabled.

In some implementations, two or more types of battery packs can be serviced by the battery-swapping system. For example, such battery pack types can have a common external form factor and equivalent quick disconnects, but may have different energy capacity.

A battery-swapping system can be implemented on top of a trailer for increased mobility. Generally, the battery-swapping operations should be performed in an enclosed or at least covered location. For example, a trailer can be custom built with sides that pop out for increased space, and ramps on either side so the vehicle can be driven in and out of the battery-swapping facility.

Depleted batteries can be charged at the location of the swapping system (e.g., using grid power or other electric resource) or fully charged battery packs can be delivered to the location.

A number of implementations have been described as examples. Nevertheless, other implementations exist and are covered by the following claims.

What is claimed is:

1. A system for exchanging an electrical energy storage system (EESS) of an electric vehicle serviced by the system, the system comprising:
   an EESS exchange station configured to position an electric vehicle in x and y directions, wherein the x direction relates to a direction of travel of the electric vehicle and the y direction is perpendicular to the x direction in a horizontal plane, the electric vehicle including a first EESS;
   vehicle lifts positioned to be on opposing sides of the electric vehicle in the y direction, the vehicle lifts configured to raise the electric vehicle to a predetermined height;
   battery lifts, including battery support structures, positioned outside respective vehicle lifts in the y direction, the battery lifts configured to raise the battery support structures toward the raised electric vehicle until the battery support structures are correctly positioned to engage and support the first EESS after the first EESS is unfastened from the electric vehicle, the battery lifts further configured to lower the first EESS; and
   an EESS conveyor configured to receive the first EESS after the first EESS is lowered by the battery lifts, and configured to present a second EESS to the battery lifts, wherein the battery lifts are further configured to raise the second EESS to the electric vehicle.

2. The system of claim 1, wherein the battery support structures extend around respective vehicle lifts.

3. The system of claim 1, further comprising one or more rollers configured to guide the electric vehicle.

4. The system of claim 3, further comprising a horizontal door having at least one tube positioned thereon for guiding the electric vehicle.

5. The system of claim 1, further comprising at least one vehicle chock for positioning the electric vehicle in at least one of the x direction and the y direction.

6. The system of claim 1, wherein the vehicle lifts comprise lifting arms configured to engage jack pads of the electric vehicle.

7. The system of claim 6, wherein the vehicle lifts are configured to engage the electric vehicle at four points.

8. The system of claim 1, further comprising one or more floor doors located below the vehicle lifts.

9. The system of claim 8, wherein the one or more floor doors comprises one or more pivoting doors.

10. The system of claim 1, wherein the battery support structures include ball transfer pads for engaging the EESS.

11. A system for exchanging an electrical energy storage system (EESS) of an electric vehicle serviced by the system, the system comprising:
    an EESS exchange station configured for positioning an electric vehicle in x and y directions, wherein the x direction relates to a direction of travel of the electric vehicle and the y direction is perpendicular to the x direction in a horizontal plane, the electric vehicle including a first EESS;
    first means for raising the electric vehicle to a predetermined height;

second means to engage and lower the first EESS; and an EESS conveyor located underneath the second means, configured to receive the first EESS after the first EESS is lowered by the second means, and configured to present a second EESS to the second means, wherein the second means further for raising the second EESS to the electric vehicle.

12. The system of claim 11, wherein battery support means of the second means extend around the first means.

13. A system for exchanging an electrical energy storage system (EESS) of an electric vehicle serviced by the system, the system comprising:

an EESS exchange station configured for positioning an electric vehicle in x and y directions, wherein the x direction relates to a direction of travel of the electric vehicle and the y direction is perpendicular to the x direction in a horizontal plane, the electric vehicle including a first EESS;

vehicle lifts positioned to be on opposing sides of the electric vehicle in the y direction, the vehicle lifts configured to raise the electric vehicle to a predetermined height; and battery lifts, including battery support structures, positioned outside respective vehicle lifts in the y direction, the battery lifts configured to raise the battery support structures toward the raised electric vehicle until the battery support structures are correctly positioned to engage and support the first EESS after the first EESS is unfastened from the electric vehicle, the battery lifts further configured to lower the first EES S.

14. The system of claim 13, further comprising an EESS conveyor configured to move the first EESS from below the electric vehicle and to move a second EESS to below the electric vehicle.

15. The system of claim 13, wherein the battery support structures extend around respective vehicle lifts.

16. The system of claim 13, further comprising one or more rollers configured to guide the electric vehicle.

* * * * *